US010616725B2

(12) United States Patent
Cheng et al.

(10) Patent No.: US 10,616,725 B2
(45) Date of Patent: Apr. 7, 2020

(54) PROVIDING LOCATION-BASED MESSAGES USING SOCIAL NETWORK INFORMATION

(71) Applicant: Motie Shivtahal, South Richmond Hill, NY (US)

(72) Inventors: Kit Ning Cheng, Brooklyn, NY (US); Simon Kandial, Ozone Park, NY (US); Harjeet Singh, Bear, DE (US)

(73) Assignee: Motie Shivtahal, South Richmond, NY (US)

( * ) Notice: Subject to any disclaimer, the term of this patent is extended or adjusted under 35 U.S.C. 154(b) by 20 days.

(21) Appl. No.: 15/254,876

(22) Filed: Sep. 1, 2016

(65) Prior Publication Data

US 2018/0063684 A1 Mar. 1, 2018

(51) Int. Cl.
| H04W 24/00 | (2009.01) |
| G06Q 30/00 | (2012.01) |
| G06Q 10/00 | (2012.01) |
| H04W 4/12 | (2009.01) |
| H04W 4/21 | (2018.01) |
| H04W 4/80 | (2018.01) |
| H04L 12/58 | (2006.01) |

(52) U.S. Cl.
CPC ............... *H04W 4/12* (2013.01); *H04L 51/20* (2013.01); *H04L 51/32* (2013.01); *H04W 4/21* (2018.02); *H04W 4/80* (2018.02)

(58) Field of Classification Search
CPC ........... H04W 4/12; H04W 4/21; H04W 4/80; H04W 4/02
See application file for complete search history.

(56) References Cited

U.S. PATENT DOCUMENTS

| 7,343,317 B2 | 3/2008 | Jokinen et al. |
| 7,752,209 B2 | 7/2010 | Ramer et al. |

(Continued)

FOREIGN PATENT DOCUMENTS

| CA | 2917487 | 1/2015 |
| EP | 3043576 | 7/2016 |

(Continued)

OTHER PUBLICATIONS

"PeppyPub Pre Launch Event Flyers" Feb. 7, 2015, Babita Persaud, personal blog, available at https://babitapersaud.squarespace.com/blog/2015/2/7/peppypub-pre-launch-event-flyers.*

(Continued)

*Primary Examiner* — Rafael Pérez-Gutiérrez
*Assistant Examiner* — Mark G. Pannell
(74) *Attorney, Agent, or Firm* — Fish & Richardson P.C.

(57) ABSTRACT

Methods, systems, and apparatus, including computer programs encoded on a computer storage medium, for providing location-based messages using social network information. In some implementations, data received from a user device includes identifying data for a wireless transmitter detected by the user device. Stored data that indicates messages corresponding to wireless transmitters at different locations is accessed. The stored data may associate content of a social network with the wireless transmitters. A message corresponding to the wireless transmitter is determined based on the stored data. The determined message is provided for display at the user device while the user device is in proximity of the wireless transmitter.

21 Claims, 12 Drawing Sheets

(56) References Cited

U.S. PATENT DOCUMENTS

| | | | |
|---|---|---|---|
| 9,326,226 B2 | 4/2016 | Bahram | |
| 2002/0196280 A1* | 12/2002 | Bassett | G06Q 10/109 715/751 |
| 2005/0209921 A1 | 9/2005 | Roberts et al. | |
| 2006/0253453 A1 | 11/2006 | Chmaytelli et al. | |
| 2007/0136132 A1 | 6/2007 | Weiser et al. | |
| 2008/0207296 A1 | 8/2008 | Lutnick et al. | |
| 2010/0323716 A1 | 12/2010 | Jaffri | |
| 2011/0029362 A1 | 2/2011 | Roeding et al. | |
| 2011/0082746 A1 | 4/2011 | Rice et al. | |
| 2012/0036015 A1 | 2/2012 | Sheikh | |
| 2012/0115512 A1 | 5/2012 | Grainger et al. | |
| 2012/0271715 A1 | 10/2012 | Morton et al. | |
| 2013/0085804 A1* | 4/2013 | Leff | G06Q 30/0219 705/7.29 |
| 2014/0358666 A1 | 12/2014 | Baghaie et al. | |
| 2015/0079942 A1* | 3/2015 | Kostka | H04W 4/21 455/411 |
| 2015/0081418 A1 | 3/2015 | Sahai | |
| 2015/0140982 A1* | 5/2015 | Postrel | H04W 4/008 455/418 |
| 2015/0161643 A1 | 6/2015 | Randell et al. | |
| 2015/0248702 A1 | 9/2015 | Chatterton | |
| 2015/0262245 A1 | 9/2015 | Arvanitis | |
| 2015/0317682 A1 | 11/2015 | Kayser et al. | |
| 2015/0339655 A1 | 11/2015 | Basheerahammed et al. | |
| 2016/0012483 A1 | 1/2016 | French et al. | |
| 2016/0012484 A1 | 1/2016 | Hanson et al. | |
| 2016/0048872 A1 | 2/2016 | Sanchez et al. | |
| 2016/0148269 A1 | 5/2016 | Lamont et al. | |
| 2016/0162938 A1* | 6/2016 | LeBeau | G06Q 50/01 705/14.53 |
| 2016/0169696 A1 | 6/2016 | Buttz, III et al. | |
| 2016/0321702 A1* | 11/2016 | Lerman | G06Q 30/0267 |

FOREIGN PATENT DOCUMENTS

| | | |
|---|---|---|
| WO | WO2008054671 | 5/2008 |
| WO | WO2010098938 | 9/2010 |
| WO | WO2014121024 | 8/2014 |
| WO | WO2015183388 | 12/2015 |
| WO | WO2016109754 | 7/2016 |

OTHER PUBLICATIONS

'Beaconstac.com' [online] "25 Retailers Nailing it with their Proximity Marketing Campaigns," Feb. 11, 2016, [retrieved on Sep. 30, 2016], Retrieved from the Internet: URL<http://blog.beaconstac.com/2016/02/25-retailers-nailing-it-with-their-proximity-marketing-campaigns/>. 15 pages.

'Developers.Google.com' [online] "Mark up the world using beacons," Posted on or before Jul. 15, 2015, [retrieved on Sep. 30, 2016], Retrieved from the Internet: URL <https://developers.google.com/beacons/>. 8 pages.

'Estimote.com' [online]. "Create magical experiences in the physical world," posted on or before Oct. 28, 2012, [retrieved on Sep. 30, 2016], Retrieved from the Internet: URL<http://estimote.com/>. 13 pages.

'Forbes.com' [online] "How Proximity Marketing is Driving Retail Sales," Oct. 8, 2014, [retrieved on Sep. 30, 2016], Retrieved from the Internet: URL <http://www.forbes.com/sites/gregpetro/2014/10/08/how-proximity-marketing-is-driving-retail-sales/#53501293ff50>. 4 pages.

'ibeacon.com' [online]. "iBeacon Wars: A guide to iBeacon solutions," posted on or before Apr. 30, 2014, [retrieved on Sep. 30, 2016] Retrieved from the Internet: URL<http://www.ibeacon.com/ibeacon-wars-a-guide-to-the-major-ibeacon-companies/>. 17 pages.

'ibeacon.com' [online]. "Wisconsin Badgers tap Beacons for Better Fan UX," posted on or before Oct. 30, 2015, [retrieved on Sep. 30, 2016], Retrieved from the Internet: URL<http://www.ibeacon.com/wisconsin-badgers-tap-beacons-for-better-fan-ux/>. 4 pages.

'Macworld.co' [online] "iBeacon in iOS getting location based notifications, plus: FCC filing suggests Apple to launch own iBeacon hardware," posted on or before Sep. 4, 2014, [retrieved on Sep. 30, 2014], Retrieved from the Internet: URL <http://www.macworld.co.uk/news/iosapps/apples-plans-for-ibeacon-hardware-new-ios-8-location-notifications-3542708/>.

'Proxima.sf' [online] "Nexto Case Study," posted on or before Jan. 16, 2016, [retrieved on Sep. 30, 2016], Retrieved from the Internet: URL<http://web.archive.org/web/20160116193125/http://proxima.si/project/nexto/>. 6 pages.

'Wikepedia.org' [online]. "Near field communication," Dec. 11, 2003, [retrieved on Sep. 30, 2016], Retrieved from the Internet: URL<https://en.wikipedia.org/wiki/Near_field_communication>. 13 pages.

'Wikipedia.org' [online]. "Bluetooth low energy beacons," Apr. 9, 2016, [retrieved on Sep. 30, 2016], Retrieved from the Internet: URL <https://en.wikipedia.org/wiki/Bluetooth_low_energy_beacons>. 7 pages.

'Wikipedia.org' [online]. "Facebook Bluetooth Beacon," Jul. 30, 2015, [retrieved on Sep. 30, 2016]. Retrieved from the Internet: URL <https://en.wikipedia.org/wiki/Facebook_Bluetooth_Beacon>. 1 page.

\* cited by examiner

| Beacon Identifier | Content | Location | Organization | Authorized Users | Display Type | ... |
|---|---|---|---|---|---|---|
| 3124 | post_6847 | 123 Main St. | Joe's Club | joe87 | Notification | ... |
| 3249 | post_932 and post 832 | 123 Main St. | Joe's Club | joe87 | SMS | ... |
| 3367 | www.example.com/message | 678 Oak Dr. | Emily's Diner | emily48, sarah_M | Full-screen display in app | ... |
| ... | | | ... | | | ... |

FIG. 7

PROVIDING LOCATION-BASED MESSAGES USING SOCIAL NETWORK INFORMATION

BACKGROUND

Short-range wireless communication protocols, such as Wi-Fi® and Bluetooth®, allow messages to be provided to devices located near a transmitter.

SUMMARY

In some implementations, a location-based messaging system allows businesses, such as restaurants, hotels, bars, clubs, lounges, theaters, and other businesses, to provide location-based messages to people located nearby. The owner or manager of a location can specify customized content to be presented on a person's mobile phone or other device when, for example, the person walks by the location or enters the location. A business location can be equipped with one or more short-range wireless beacons. When a person's mobile device detects a transmission from a beacon, an application on the mobile device may obtain and present the content corresponding to the specific beacon detected. Through these beacon-triggered messages, businesses can provide various types of offers, such as coupons, discounts, advertisements, free trials, tickets, games, notices, and other types of information.

In some implementations, the location-based messaging system provides an interactive user interface that allows businesses to easily and remotely change the content that users see when a beacon transmission is detected. A server system can maintain and update associations between individual beacons and the corresponding content presented to users when near those beacons. A beacon management interface can allow businesses to communicate with the server system over a computer network to change the associations in real time. When a mobile device detects a beacon message, the mobile device can contact the server system and obtain the most recent content designated for that beacon. As a result, businesses can change the content to be displayed on a user's device without any need to alter the beacon message transmitted locally over the short-range wireless channel. The beacon management interface can be provided as a web page, an application, or other user interface. With this interface, businesses can customize many aspects of a user's experience when a beacon message is detected. In addition, businesses can conveniently manage multiple beacons for a location and/or beacons at different locations through a single, convenient user interface, which can be accessible through the World Wide Web or mobile device applications.

The location-based messaging system can use information from or be integrated with a social network. In some implementations, the social network is focused on the hospitality and entertainment industries. Businesses, consumers, and service professionals can each have profiles in the social network. Businesses can then select posts or other content associated with their social network profiles to assign for display when specific beacons are detected. The location-based messages can thus show content from the social network, such as up-to-date comments and ratings. The location-based message provided can be tailored for each individual user, for example, by showing comments, ratings, or other interactions of others who are connected to the user in the social network. Similarly, a user's preferences and interactions in the social network can be used to select which of multiple offers associated with a beacon should be shown to the user.

In addition, the integration with the social network can enable users to take actions in the social network directly from the display of a location-based message. For example, the location-based message can include a button or other control that a user can interact with to rate, comment on, or share the message. As another example, controls may be provided in the location-based message for inviting another member of the social network to join in an offer, e.g., by proposing or scheduling a meeting at the location associated with the message. As another example, a control may be included in the location-based message for designating the message, the associated location, or the business as a favorite in the user's social networking profile. In some implementations, the mobile application that provides the location-based messages is a social networking application that allows users to access the social network. In addition to providing location-based messages, the application can allow users to browse content in the social network to post content to the social network as well as view and/or discover posts, events, information about other users of the social network, and so on.

The arrangement of the system described in this document addresses a number of problems with prior messaging techniques. In many prior systems, changing beacon messages and the resulting displays to users is difficult and often does not allow locations to provide up-to-date content. Some prior beacon systems required communication with each individual beacon, often through direct communication or physical access, in order to change the experience of a user nearby. Even if messages shown to users can be changed, the process often requires a user to specify new computer code or involves significant delays for the changes to take effect. In some instances, beacon devices have been hacked by malicious users to provide altered transmissions contrary to what the owner intended. In addition, the task of managing beacons can be burdensome, especially across multiple locations and where locations include multiple beacons. These challenges and the costs of maintaining a messaging system have discouraged many locations from deploying beacon-based messaging, especially small businesses like restaurants or others that do not have programming expertise. Even for locations that have beacons, the difficulty of changing the user experience has limited the usefulness of the user experience.

The arrangement of the location-based messaging system, the mobile application, and the beacon management interface can provide a number of advantages. Various implementations may provide one or more of the following. For example, location owners have the flexibility to change their messages quickly and remotely, without needing any physical access or change to the beacon device itself. Using a web page or an application, a business user can change which content to provide for specific beacons, and the server system can make the changes effective in seconds or less. Businesses benefit from customized, fine-grained control to specify the behavior of each of multiple beacons from a single application or website. The business user can make changes to the user experience after a beacon is detected without programming any computer code. Indeed, the management can be as quick and straightforward as selecting a social media post using a drop-down menu or other control. The ability to use social media information in the posts provides a new level of customization for users, and also enables businesses to maintain consistent offers over multiple platforms. A server can provide these benefits to a large group of independent locations, such as many different restaurants, pubs, hotels, etc. that are separately owned and operated.

The content of the location-based messages is also enhanced by using social network information. Customers receive high-quality messages, and can receive relevant ratings, comments, and so on with the messages from nearby locations.

Along with the flexibility to easily specify and customize user experiences, the security of the location-based messaging system is enhanced. After initial set up, a beacon device can be securely locked to block malicious changes to the beacon transmissions. The beacon device can be a simple wireless transmitter, and may not include a wireless receiver, which also enhances security and maintains a low cost. Installation, management, and maintenance of the beacons can handled as a service provided by a third-party organization, such as the organization that provides the social networking platform.

One innovative aspect of the subject matter described in this specification is embodied in methods that include the actions of: receiving, by the mobile device, a wireless message from a wireless transmitter, the wireless message including identifying data that identifies the wireless transmitter; sending, by the mobile device, the identifying data for the wireless transmitter to a server system over a network; receiving, by the mobile device, content selected based on the identifying data for the wireless transmitter, wherein at least a portion of the content is from a social network; and displaying, by the mobile device, the received content while the mobile device is in proximity of the wireless transmitter.

These and other embodiments may each optionally include one or more of the following features. For instance, in some implementations, receiving the content comprises receiving content selected for a user of the mobile device based on a profile for the user in the social network.

In some implementations, receiving the content comprises receiving a comment in the social network that was submitted by a second user that has a relationship in the social network with the user of the mobile device. For example, a user identity of the second user can be directly connected with a user identity of the user of the mobile device. As another example, a user identity of the second user can be indirectly connected with a user identity of the user of the mobile device through no more than a maximum number of indirect connections, e.g., the second user may be a friend of a friend of the user of the mobile device. Displaying the content can include displaying the comment of the second user.

In some implementations, sending the identifying data for the wireless transmitter comprises sending, by the mobile device, a request to the server system that includes data identifying the mobile device or the user of the mobile device.

In some implementations, the mobile device is a phone.

In some implementations, the wireless transmitter is a Bluetooth® beacon.

In some implementations, displaying the received content comprises displaying the received content while the mobile device is located within an area that the mobile device detects signals from the wireless transmitter.

In some implementations, the method includes determining, by the mobile device, that the wireless message from the wireless transmitter corresponds to a particular application of the mobile device; and providing data from the wireless message to the particular application, wherein the particular application is configured to cause the mobile device to send the identifying data, receive the content, and display the content.

In some implementations, displaying the received content comprises displaying, with the received content, at least one interactive control for taking an action in the social network, wherein the action comprises at least one of following a business associated with the wireless transmitter, adding a content in the social network, sharing the received content, or designating an item as a favorite.

In some implementations, the wireless transmitter is located at location of a business, wherein receiving the content comprises receiving a post in the social network that a representative of the business designated to be displayed in response to detection of the wireless message from the wireless transmitter.

In some implementations, displaying the content comprises displaying the content in a notification interface of an operating system of the mobile device or through an interface of an application of the mobile device.

In some implementations, the mobile device displays the received content within a maximum amount of time from detection of the wireless message, such as within 30 seconds, 15 seconds, 10 seconds, 5 seconds, or 1 second of detection of the wireless message.

Another innovative aspect of the subject matter described in this specification is embodied in methods that include the actions of: receiving, by one or more computers, data from a user device, the received data including identifying data for a wireless transmitter detected by the user device; accessing, by the one or more computers, stored data that indicates messages corresponding to wireless transmitters at different locations, where the stored data associates content of a social network with the wireless transmitters; determining, by the one or more computers, a message corresponding to the wireless transmitter based on the stored data; and providing, by the one or more computers, the determined message for display at the user device while the user device is in proximity of the wireless transmitter.

These and other embodiments may each optionally include one or more of the following features. For instance, in some implementations, the stored data comprises mapping data that maps identifiers for wireless transmitters to posts in the social network.

In some implementations, the stored data includes data that specifies, for each of multiple independent businesses, content in the social network that the business has designated to be presented on user devices in response to detection of a signal from a wireless transmitter of the business.

In some implementations, the wireless transmitter includes a Bluetooth® beacon, and receiving the data from the user device comprises receiving data included in a transmission from the Bluetooth® beacon.

In some implementations, the wireless transmitter includes a near-field communication (NFC) transmitter, and receiving the data from the user device comprises receiving data included in a transmission from the NFC transmitter.

In some implementations, receiving the data from the user device comprises receiving a user identifier for a user of the user device, and determining the message comprises determining the message based on the user identifier.

In some implementations, determining the message corresponding to the wireless transmitter comprises: obtaining user profile information for the user from a user profile of the user in the social network; identifying multiple messages that the stored data associates with the wireless transmitter;

and selecting, from among the multiple messages associated with the wireless transmitter, a particular message to provide to the user device of the user based on the user profile information for the user.

In some implementations, the method includes customizing the selected message based on the user profile information for the user; and wherein providing the determined message comprises providing the customized message for display at the user device.

In some implementations, the wireless transmitter is located at a location of a business. Determining a message corresponding to the wireless transmitter based on the stored data comprises: obtaining content indicating an offer provided by the business; and obtaining at least one comment or rating from the social network regarding the offer, the location, or the business. Providing the determined message comprises providing the content indicating the offer and the at least one rating.

In some implementations, obtaining the at least one comment or rating comprises selecting, as the at least one comment, a comment or rating provided a second user based on a relationship in the social network, for example, a relationship of the second user with the first user in the social network.

In some implementations, the method includes providing data causing the user device to display, with the determined message, at least one interactive control configured to initiate an action in the social network.

In some implementations, the method includes providing, over a computer network, data for a user interface configured to receive user input to change content provided for display in response to detection of a signal from the wireless transmitter without altering the signal from the wireless transmitter.

In some implementations, the wireless transmitter is located at a location of a business, and providing the data for the user interface comprises providing a user interface having one or more interactive elements to designate a post associated with a profile in the social network as a message to be displayed in response to detection of a signal from the wireless transmitter.

In some implementations, the determined message is a first message, and wherein the wireless transmitter is located at a location of a business. The method includes receiving data indicating user input provided to the user interface by a representative of the business, the data indicating a selection of a second message to designate as corresponding to the wireless transmitter, the second message being different from the first message. The method includes, in response to receiving the data indicating the user input, updating the stored data to designate the second message to be provided for display in response to detection of the signal from the wireless transmitter.

In some implementations, the method includes, after updating the stored data: receiving, from a particular device, second data including the identifying data for the wireless transmitter; and providing, in response to receiving the second data, the second message for display by the particular device based on the updated stored data.

In some implementations, providing the data for the user interface comprises providing data for an interface that includes a drop-down menu permitting a user to select, from among multiple wireless transmitters located at a business, a wireless transmitter to associate with a particular item of content in the social network.

Other embodiments of these aspects and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is a diagram that illustrates a table that indicates associations between beacons and content to be provided when a beacon is detected.

Like reference numbers and designations in the various drawings indicate like elements.

DETAILED DESCRIPTION

Figure 1:
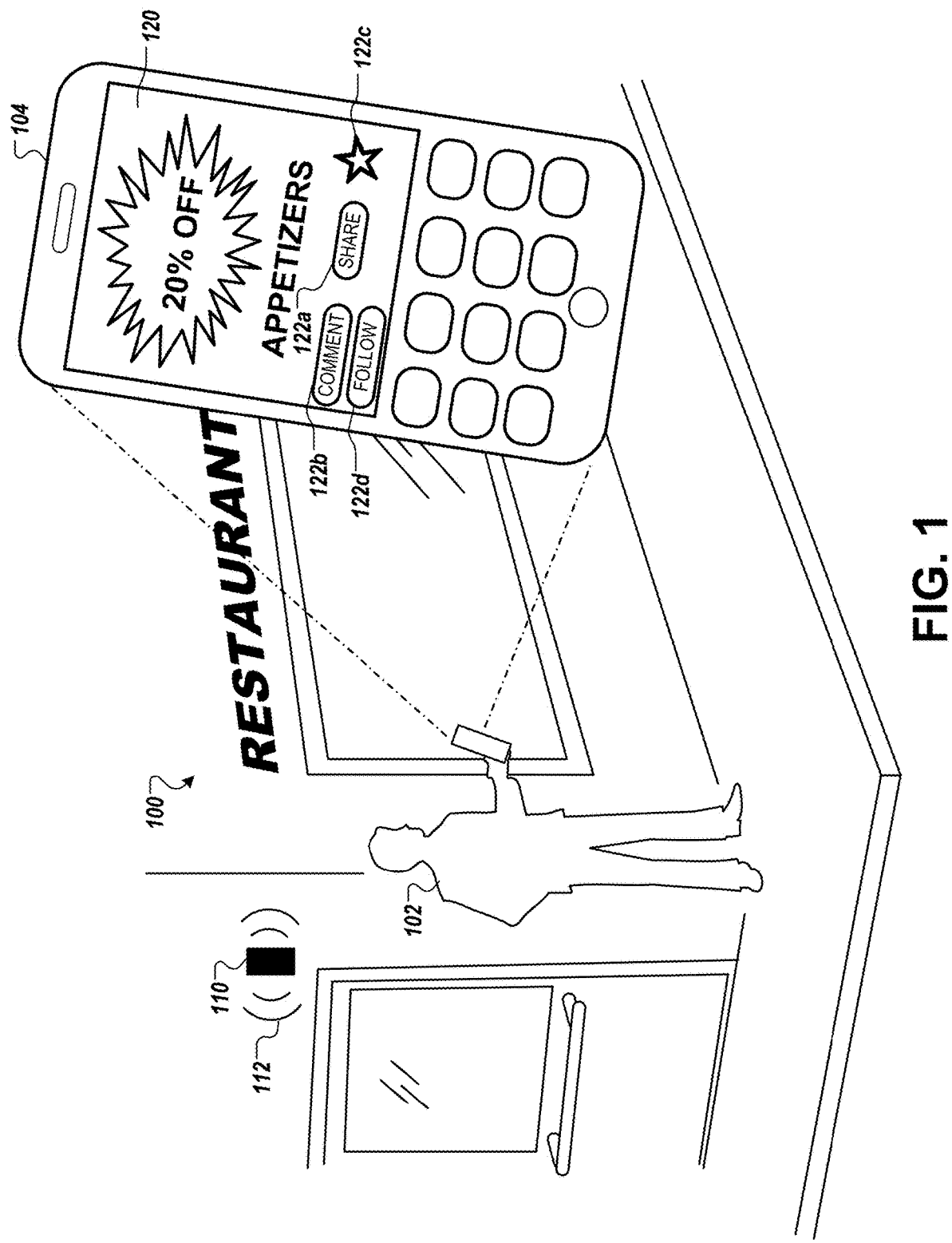
FIG. 1 is a diagram that illustrates an example of providing a location-based message.

Referring to FIG. 1, location-based messages can be provided for display at a user device when a user is in proximity of a location. Many types of locations, such as restaurants, pubs, theaters, and others, can have beacons that transmit messages using a short-range wireless communication channel, such as Bluetooth®. When a device detects the message from a beacon, a message that is relevant to the location can be provided.

In the example of FIG. 1, a restaurant 100 has a beacon 110 arranged to transmit a wireless signal 112 to an area around the restaurant 100. A person 102 with a mobile device 104 walks by the restaurant 100, and the mobile device 104 receives the wireless signal 112 from the beacon 110. The detection of the wireless signal 112, e.g., a beacon message, triggers the display of a location-based message 120 on the mobile device 104, with information that is tailored to the restaurant 100 nearby. For example the location-based message 120 can provide an offer from the restaurant 100, such as a coupon, discount, an advertisement, a free trial, a ticket, a game, a notice, or other information. The location-based message 120 may include text and/or multimedia content, such as images, audio, animations, and/or video. The location-based message 120 may include interactive content, such as a game or other interactive interface.

Examples of mobile devices 104 include, for example, mobile phones, tablet computers, watches and other wearable devices, and navigation systems. Any device with an appropriate wireless receiver can be used to receive wireless signals 112 and provide a location-based message 120.

The mobile device 104 may have an application installed that facilitates providing location-based messages. The application can be configured to interpret beacon information and display location-based messages for a variety of different locations that are independently owned and operated. Beacons for many different locations can transmit data indicating that the beacon is associated with the application, e.g., through a code, a portion of a URL, or other identifying data. From this information, the mobile device 104 can determine that the beacon message should be passed to the application, which can obtain and provide the appropriate location-based message.

Figure 2:
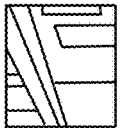
FIG. 2 is a diagram that illustrates an example of a user interface for a social networking application for a mobile device.

In some implementations, the application is associated with a social network, for example, a social network focused on the hospitality and entertainment industries. The application can enable the mobile device 104 to access and present information from the social network, as shown in FIG. 2. The location-based message 120 can also include information from the social network.

In some implementations, the main content of the location-based message 120 is a post or other item from the social network that was provided by the restaurant. For example, the message 120 include content that the restaurant published using a social network profile for the restaurant. In addition, or as an alternative, other social network information may be included in or appended to the location-based message 120. For example, comments related to the location or ratings for the location may be added to the location-based message 120. As another example, comments, ratings, or other social network information may be provided for a specific subset of users of the social network, such as the subset of user's that are friends with or otherwise connected to the user 102 in the social network. This allows the social network information in the location-based message 120 to be tailored for the specific user 102 viewing the message, and to include information from people to user 102 trusts.

The social network information in the location-based message 120 can include interactive elements. For example, a control 122a for sharing the location-based message 120 with other users can be included. A control 122b for adding a comment in the social network regarding content of the location based-message 120, or regarding the location or business more generally, can also be provided in or with the location-based message 120. Optionally, information about ratings or reviews can be included, as well as one or more controls 122d allowing the user 102 to enter a rating for the offer in the message 120, the location, or the business at the location. As another example, a control 122c for designating a favorite can be included. This can save information to the user's profile in the social network, and may unlock additional functionality or communications from the location. Users may designate the offer in the message 120 or a related item as a favorite, e.g., by saving a coupon for indicating an advertised meal is a favorite. In a similar manner, a user may designate a specific location as a favorite, or specify the business application as a favorite. Additional controls may allow the user 102 to establish or modify connections of the user 102 to other profiles in the social network, for example, by establishing a link with a social network profile for the business at that sent the location-based message 120. As another example, a control can be included to send an invitation to another user of the social network to meet with the user 102 to use the offer mentioned in the location-based message 120.

Referring to FIG. 2, a user interface 200 shows an example of a view of social network information. The user interface 200 may be provided by, for example, an application on the mobile device 104 or a webpage that is displayed through a web browser.

The social network can allow for multiple types of user accounts or profiles. For example the social network can have different categories of user profiles for business users, service professional users, and general users. Each profile type can allow a different set of features and interactions in the social network. In some implementations, the social network is focused on the hospitality and entertainment industries, such as restaurants, bars, pubs, lounges, theaters, concert venues, hotels, theme parks, and so on. Accordingly, the social network can provide features that facilitate discovery and sharing of places that consumers can stay, eat, and be entertained.

In general, business users can be owners, managers, administrators, or other representatives of a business location. Business users can use the social network to provide information about their location for delivery through the social network website, mobile application, or location-based messages. The business users can enter content in a familiar manner, such as by posting text, images, or other content to the social network. The business users can then use various interfaces to designate their content as a location-based message to be displayed in response to a user's proximity to their business locations. When a user approaches the business that user device detects a beacon for the business, receipt of the beacon message triggers the mobile application to provide content associated with the beacon. As discussed further below, a business user may remotely change which content is provided in response to each beacon associated with his business using an interface of a webpage or application. This allows the business user to immediately change the content viewed when a user arrives, without requiring any programming, change to the beacon device, or other setup.

Business users can also use the social network in a number of other ways. For example, business users can provide recognition or incentives to boost employee morale through the social network. Business users may also post job openings and receive job applications through the social network.

Service professional users can be waiters and waitresses, kitchen staff, front desk clerks, concierge workers, porters, housekeeping staff, supervisors, and other workers. Service professional users can create a professional profile that allows them to highlight their experience and skills, helping them to create a personal brand that persists from one job to another. Service professional users may receive ratings from others, such as coworkers, customers and employers. Users may share these ratings privately with other users of the social network at their discretion, for example, when applying for a new position. Information from the profile of a service professional user can be compiled into a job application automatically by the social networking platform when the service professional user decides to apply for an open position.

General users, such as consumers, can use the social network to discover new places and businesses. The social network gives users a way to recommend places they like to others, and to learn about new places. Users can open the application or web page for the social network to see what events, entertainment, and businesses are nearby. Users can also save offers and locations for later reference, for example, by selecting an item as a favorite. When a user designates a business or location as a favorite, additional communications and functionality can be unlocked. For example, by default, users may receive notifications and other messages from a location outside the social network interface only when in proximity to a location. After a user selects a location as a favorite, however, the location may be able to provide messages at other times, even if the user is not currently near the location.

In some implementations, the information provided to general users through the social network is focused on aiding discovery of new locations, based on popularity among users. Rather than relying on ratings or reviews, which may be biased, ranking can be done based on the popularity determined by interactions with a location or its content in the social network. For example, the number of visits to a location, purchases at the location, shares of content associated with the location, and/or users that designate the location as a favorite can be used to select which content to show other users and how prominently to display the content.

Other types of user profiles can also be included in the social network. For example, a vendor user profile type can be included for vendors that supply materials to businesses. Vendor profiles may include different information and may allow different connections with business profiles than other types of user profiles.

The social network allows various types of connections. For example, direct connections between different profiles can be made for friends, family, co-workers, and so on. Users of all types may be able to post content, provide comments and ratings, and send messages to other users through the social network. Content posted in the social network can be supplied with privacy or viewing restrictions. For example, content may be posted publically for all users to see, or for a group of users such as friends or direct connections only, or for to a specific user.

Referring still to FIG. 2, the user interface 200 shows a "moments" view that shows social network posts 210 from a variety of different sources. The posts may represent new or popular activity of users of the social network generally, or posts relating to a geographical area or topic of interest to the user 102. These posts may include, for example, photos or text posted by friends or information from local businesses. For example, messages posted by businesses or users in the same city or neighborhood as the user 102 maybe prioritized in the user interface 200. As another example, the posts shown may be selected or ranked according to the activity of users who are friends with or otherwise connected with the user 102 in the social network. As a result of these techniques, the moments view may show a variety of posts that are relevant to the user 102 based on the interactions of the friends of the user 102, the activity of businesses that the user 102 has visited or has marked as a favorite, or posts that have been interacted with or rated highly by users of the social network in the same city or geographical region as the user 102.

A number of techniques may be used to determine the location of the user 102 and thus an area that may be of interest to the user 102 at a given time. In some implementations, a profile for the user 102 in the social network may indicate the user's home location or one or more other locations of interest, such as a work location or locations that the user is interested in. As another example, an IP address or GPS location of the mobile device 104 can be used to determine the location of the user 102. In some implementations, the social network tracks the identity of beacons that the mobile device 104 has detected. From the detected beacon messages, a server for the social networking platform can determine the location of the last beacon detected, which may indicate the approximate location of the user 102. Other techniques can be used, such as identifying the geographical locations for beacons that the user 102 of the mobile device 104 has received, and saving those locations as locations of interest. When selecting posts for the user interface 200, a computer system can compare the location associated with the post, and determine whether the location for the particular post is same as or within a certain distance of one or more locations of interest to the user 102.

Each post in the social network may be assigned a unique identifier. Location-based messages may include a post, or at least some information from the post, and can be linked to the related post through the post identifier. This identifier allows a computer system, such as a server, to identify up-to-date information relating to the post each time a location-based message 120 is output to a user. Similarly, comments or ratings made for a location-based message 120 can be applied in the social network platform to the post. Thus the social network can track and aggregate interactions with specific content items whether provided through location-based messages 120 or through a social networking application or web page. Interactions with location-based messages can be saved in the social network, and information from the social network can be provided in the location-based messages.

The application can provide access to a number of other features of the social network. For example the user interface 200 can provide a "jobs" view may allow businesses to post information about available jobs. Users of the social network who have service professional profiles may view these open positions and submit applications for positions. When submitting job applications through the social network, a user may opt in or opt out of sharing information in the social network as part of the application. For example, endorsements, awards, or ratings that a user received in the social network may be included in a job application only at the election of the service professional.

As another example, the user interface 200 can provide an "events" view that shows information about upcoming events, such as concerts, parties, shows, and other events. Like other information provided through the application, information about events can be selected or ranked based on relevance to a user's profile, history of interactions, location, or other information. Each view of the social network can also include a search interface that allows a user to find specific content of interest. The events view can provide an interface for users to create their own private events and invite others through the social network. Each event created can include pictures, video, or other media, as well as a description, details such as the time and place, contact information which may include links or references to information in the social network, and so on. Users can search for events in a variety of ways, including by name, zip code, or type of event.

As another example, the user interface 200 can provide a "specials" view that shows promotions for various locations. This view can show, for example, offers that have been shared by the user's friends and those of businesses that the user has designated as favorites. In some implementations, the social network can provide a view of the offers that have been shown in location-based messages over a period of time. The user can thus see, through the social network, a history of offers or other messages that were provided as location-based messages, e.g., over the last day, week, month, etc. In addition to indicating the content of an offer and time the offer is available, an offer can be shown with, for example, an image, an address, a phone number or other contact information, a rating or comments, etc.

In some implementations, the user interface 200 provides background information and help to users. This information is provided in the form of a discussion forum or encyclopedia-type view with content provided or edited by the user community. The top contributors can be recognized. Discussion forums can be targeted for particular user types or user groups. For example, one discussion forum may be provided only for service professional users, allowing them to ask questions and share tips related to their work. General users may access other forums, for example, to discuss trip planning ideas, the best attractions at certain locations, and so on. Other aspects of the forums may provide instructions about how to use features of the social network. Over time, the collection of information provides a knowledge base of information about the knowledge base for the hospitality and entertainment industries, with information for each user type being tailored for the different needs of that type of user.

Figure 3:
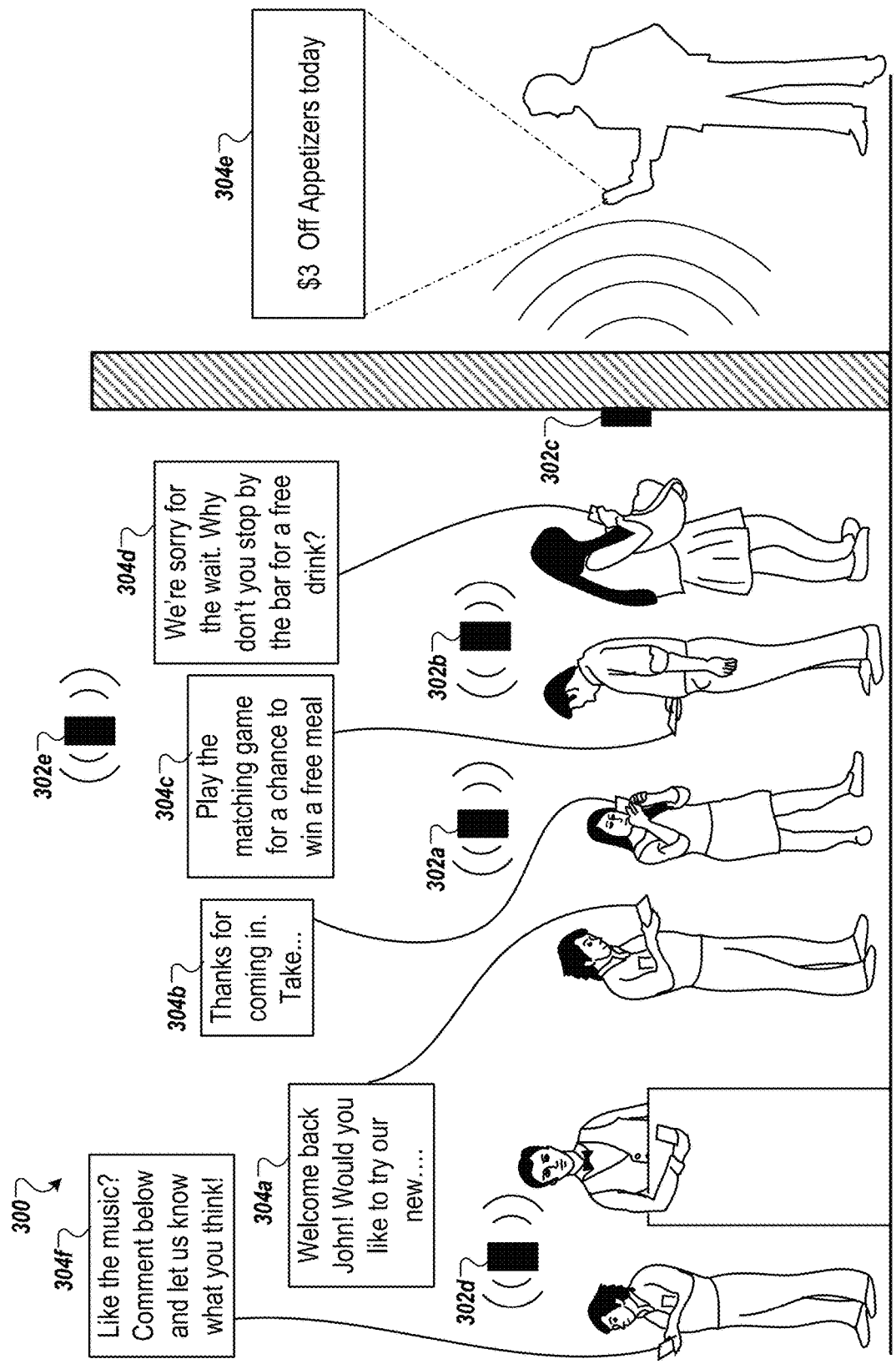
FIG. 3 is a diagram that illustrates an example of a providing location-based messages.

Referring to FIG. 3, a location 300 may have multiple beacons 302a-302d that operate concurrently, and the beacons 302a-302d may trigger multiple types of location-based messages to be provided. Each of the beacons 302a-302d transmits a different message. The wireless beacon message from each beacon 302a-302d may include identifying information, such as a beacon identifier. In some implementations, the wireless beacon messages allow an application on a user's device to obtain content for a location-based message to be obtained from a server system. The beacons 302a-302d may transmit to distinct geographical areas within a location, or may transmit to areas that partially or completely overlap.

The location 300 may be a business, for example, a restaurant, a hotel, a bar, a club, a lounge, a theater, and so on. For clarity in the discussion, the example of a restaurant is used, but the location 300 may represent any appropriate location. In the example of FIG. 3, the beacons 302a-302d are arranged to transmit their messages to different geographical areas. For example, the beacons 302a and 302b transmit inside a building, for example, to a waiting area or lobby of a restaurant. The beacon 302c transmits primarily outside the location 300, so that people walking by receive information about the business at the location 300. The beacon 302d transmits to an area of the location 300 where people are consuming the services offered by the location 300, for example, eating, drinking, socializing, dancing, and so on.

The various beacons 302a-302d trigger different location-based messages 304a-304e to be provided on the user devices for the different users. For example, the beacon 302a triggers the display of welcome information when users enter the restaurant. Although the beacon 302a repeats the same beacon message to all visitors, different information can be presented to different users who receive the beacon message. For example, one message 304a can be provided to visitors who are determined to be returning customers. A different message 304b can be provided to visitors determined to be new customers. Information about a user, such as whether the user is a first-time visitor or a returning customer, can be obtained, e.g., by the application on the user's phone or by a server system using a record of previous interactions or beacons detected, or by social network information for the user. Previous interactions may include previous purchases by a user at the current location or at other locations.

Although the beacon 302a provides the same beacon message to all devices, the application on a mobile device and a server system connected through a network can adjust or filter the messages to customize them for a particular user. For example, the restaurant owner may specify different messages to be presented to different types of users, such as new vs. returning visitors. As another example, messages can include fields or spaces for insertion of personalized information. For example, in the message 304a, the user's name, "John" is inserted in a name field of a message provided by the restaurant. Businesses can specify fields to customize using information from the social network, or the application on a user's mobile device or a server system that facilitates the display can make the customizations. Other types of customizations can also be performed. For example, a purchase history of a user or a social network profile of the user can be used to identify an offer, e.g., for a meal or other product or service, that a specific user is likely to be interested in, and that offer can be provided to the user.

In the example of FIG. 3, the beacon 302b is located in a waiting area of the restaurant. Users who are waiting to be seated can be provided information and activities that make the wait more enjoyable. For example, in response to receiving the beacon message from beacon 302b, a message 304c can offer a user a chance to play a game. For example, the game may provide information about the restaurant and its products or information about business affiliates. In some implementations, the game can be a matching game in which users match business logos or other identifiers with company information. In some instances, a reward or prize can be given for completion of the game or a certain level of achievement in the game. For example, the user may win a free meal for completing a game about the restaurant brand and its offerings.

The messages displayed to users can be adjusted according to the environment or context of a user. For example, a different message can be presented after the system determines that the user has been waiting for a certain amount of time, e.g., more than 30 minutes or another threshold time set by the restaurant. A business owner may specify how messages should change over time over the course of a visit. Following that progression, detection of the same beacon over time may prompt different messages to be shown to the user. As discussed further below, a server system cooperates with the application on a user's mobile device, allowing new messages and content to be provided even as the Bluetooth® transmission from the beacon 302b does not change. In FIG. 3, a message 304d acknowledge the long wait time of a restaurant patron and offers a free drink in response. To determine that this message 304d is appropriate, an application on the mobile device can periodically detect the beacon message from the beacon 302b and transmit that information to the associated server system. The pattern of receiving the beacon message consistently over the period of time may signal that the user is waiting within the restaurant. Once the wait time exceeds the threshold set by the restaurant, the new offer may be provided by the server system for display at the mobile device.

A third transmitter, beacon 302*c*, transmits a message outside the building, for example, to the sidewalk adjacent the restaurant. As people walk by, the location-based message 304*e* can show offers or provide other information to entice them to enter the building.

A fourth transmitter, beacon 302*d*, transmits a message to another area of the restaurant, such as a dining area where customers are seated. In response to detection of the beacon 302*d*, users can be provided content relevant to their experience in the restaurant, such as menu information, suggestions of items to order, information about the status of an order, and so on. The information provided to each user in response to detection of the beacon 302*d* may vary according to the user's particular preferences or interactions in the restaurant. In the example, detection of the beacon 302*d* causes a location-based message 304*f* to be presented on the device that detects the beacon.

In some implementations, the content of the messages varies according to the user's situation. For example, a user's interests stated in his user profile, his purchase history, items selected as favorites, or other information in the social network. A user's behavior and travel patterns can also be used. For example, the application on the user's mobile device can block or reduce the frequency that location-based messages are displayed, after the user has ignored or dismissed the messages. For example, a user that walks by a building every day without entering may not be shown the location-based message for that building each day. Instead, the location-based message may be shown only after the content changes, or at a reduced frequency such as once per week, or not at all if, for example, the user has a pattern of clearing the message when it is displayed.

In some implementations, the location 300 has a master beacon 302*e* configured to control or configure the other beacons 302*a*-302*d*. Signals from the master beacon 302*e* may not be configured to trigger the display of messages on mobile devices of visitors to the location 300. Rather, the master beacon 302*e* can communicate with each of the other beacons 302*a*-302*d*, e.g., through a wireless interface such as Wi-Fi®, Bluetooth®, NFC or through a wired interface, to provide instructions or change a configuration. The master beacon 302*e* can be assigned to manage specific beacons, and may direct messages specifically to individual beacons. For example, communications from the master beacon to one of the beacons 302*a*-302*d* may include, or be generated using, a specific code or key corresponding to the beacon to which the communications are directed. The master beacon 302*e* may thus be used to pass configuration data from a server system or from the social network to each individual beacon that the master beacon 302*e* is assigned to manage.

Figure 4:
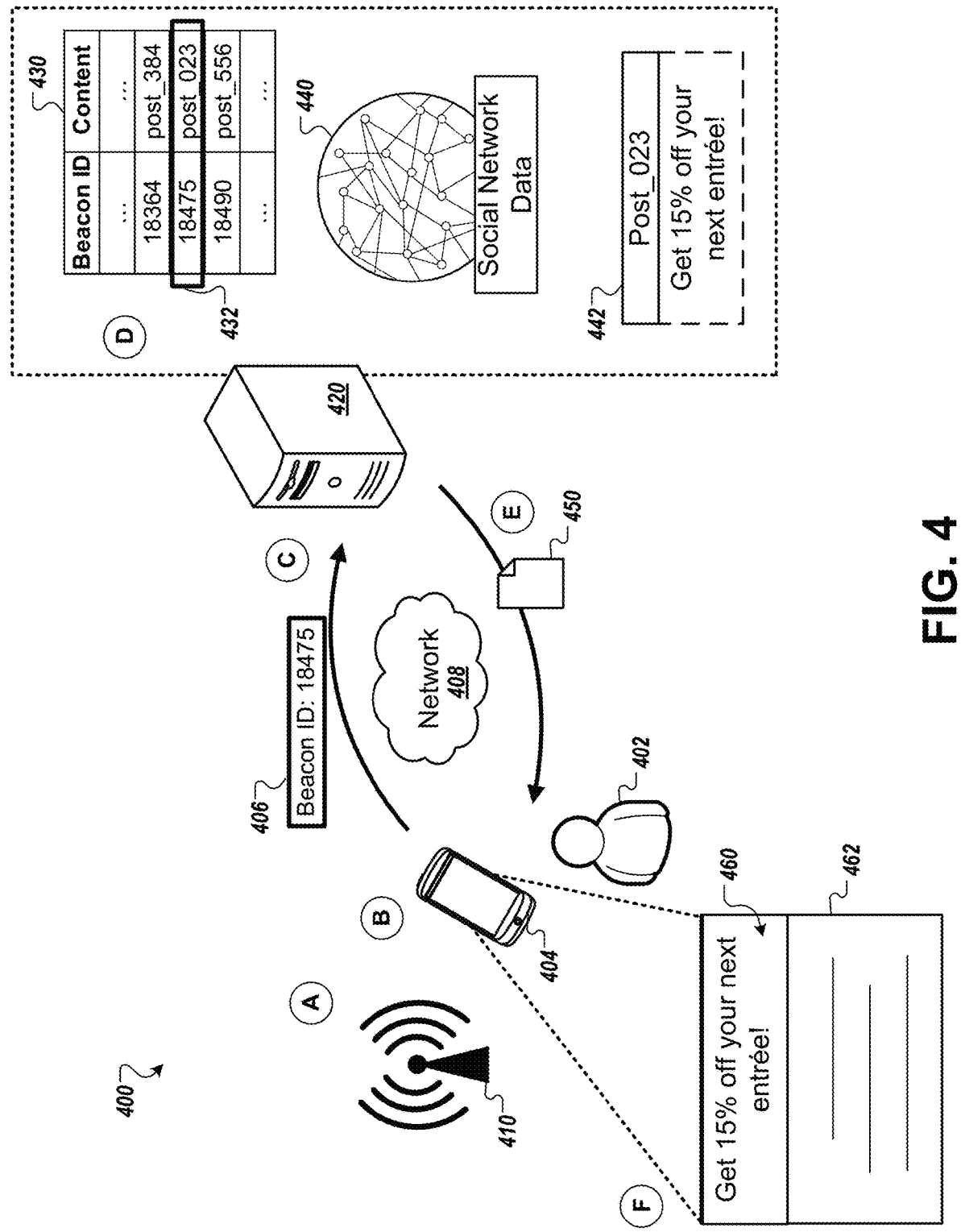
FIG. 4 is a diagram that illustrates an example of a system for providing location-based messages.

FIG. 4 is a diagram of an example of a system 400 for providing location-based messages. The system 400 includes a beacon 410 for a particular business location, such as a restaurant, a hotel, a bar, a club, a lounge, a theater, and so on, that transmits a wireless beacon message. The system 400 also includes a user device 404, such as a phone, a tablet computer, a watch or other wearable device, or another mobile device that receives the beacon message. The user device 404 communicates with a server 420 over a computer network 408. The server 420 may be a single computer, or a system of multiple computers, which may be distributed over multiple physical locations. FIG. 4 also illustrates stages (A) to (E) which show a flow of data.

In the example of FIG. 4, a user 402 enters the transmitting range of the beacon 410. The user device 404 of the user 402 then receives the beacon message from the beacon 410. Once the beacon message is detected, a mobile application of the user device 404 contacts the server 420 over the network 408 to indicate that the beacon message has been received. The server 420 then provides content to be displayed on the user interface 460 of the user device 404. As discussed further below, the content provided to the user 402 can be specified by a user of the social network. For example, a business user, such as an administrator or manager of the business location where the beacon 410 is located, can remotely and easily change which messages are provided in response to detecting the beacon 410. Thus, in the example of FIG. 4, the user device 404 does not simply display the content of the beacon message or retrieve static content from a URL in a beacon message. Instead, the mobile application and the server 420 exchange data in a way that allows the same beacon message to cause different content to be displayed at different times and for different users, as specified by the business user of the social networking platform that has authority for the beacon 410.

In stage (A), the beacon 410 transmits a beacon message. The beacon 410 can be a short-range wireless transmitter, such as a Bluetooth® beacon or other radiofrequency transmitter. The beacon 410 may be one of many beacons provided, installed, and managed as a service to businesses or other types of locations. In some implementations, an array or collection of beacons may be installed and managed on behalf of many distinct businesses by a third-party service provider, such as the organization that provides the social network. The beacon service provider may thus provide beacons and related services across large areas, e.g., multiple cities, counties, states, or countries. Each location that uses the beacons can customize the behavior of the mobile application in response to detection of that location's beacons.

The beacon 410 may transmit using any appropriate wireless communication technique. For example, the beacon 410 may transmit using Bluetooth® signals. As another example, the beacon may transmit using near-field communication (NFC) signals. In some implementations, NFC signals are signals that require a receiver to be located within 10 cm of the beacon 410 for communication. Optionally, the NFC transmission may be performed according to standards such as ECMA-340 and/or ISO/IEC 18092. As another example, the beacon 410 may transmit using Wi-Fi® signals, e.g., according to Institute of Electrical and Electronics Engineers' (IEEE) 802.11 standards. As another example, the beacon 410 may transmit an optical signal, an infrared signal, a sound signal (e.g., a sonic or ultrasonic signal), or other transmission to wirelessly convey information to the user device 404.

In some implementations, the beacon 410 may transmit messages using multiple communications protocols. For example, the beacon 410 may transmit a message over Bluetooth® and also transmit a message using NFC. In some instances, the messages sent using different communications protocols may be the same, or may prompt display of the same location-based message. In other implementations, the messages sent using different communications protocols trigger display of different location-based messages. For example, a basic message on the user device 404 may be provided when a Bluetooth® signal is detected, while a more detailed message may be provided on the user device 404 when the user approaches the beacon 410 to detect a NFC signal.

The beacon message from the beacon 410 includes identifying information that identifies the beacon 410. This identifying information may include, for example, a beacon identifier such as an identification code or number, or URL, or other identifying data. The identifying information may distinguish the beacon 410 from each of the other beacons at the same business location, and from all other beacons in the array or collection managed by the beacon service provider. In the example of FIG. 4, the beacon 410 indicates a beacon identifier "18475." As another example, the beacon message could include a URL, such as "http://www.example.com/beacon_18475."

The beacon message may also include an application code or other information that associates the beacon message with a particular mobile application. For example, the beacon message may identify the beacon service provider or the social networking platform, to indicate that the beacon 410 belongs to the collection of beacons provided by the beacon service provider. Devices that receive the beacon message can use the application code to pass the information in the beacon message to the correct application of the device for processing.

The beacon 410 maybe configured to transmit in a particular geographic area. For example, the beacon 410 may be located to transmit to an area outside a restaurant to a distance of approximately 30 feet, 50 feet, or another distance. Different beacons may be located at different places within a location, and may transmit over different distances. Different beacons can provide beacon messages with different information (e.g., different beacon identifiers), and the areas for transmission may or may not overlap. The beacon 410 may send the beacon message periodically, for example every second, every five seconds, every 30 seconds, and so on. Generally, each beacon message from the beacon 410 includes the same content. For example, the beacon 410 re-transmits the same beacon message each time.

The beacon 410 can be a simple wireless transmitter. The beacon 410 can be powered by an outlet, a USB port, a battery, or other stationary or moveable source of power. Once installed, the beacon 410 does not need to be adjusted, and can continue to transmit the same beacon message even when the content to be shown to users when near the beacon 410 has changed. This greatly reduces the need for costly maintenance or re-configuration of the beacon 410. The beacon 410 does not need to connect to a computer network or receive information from user devices. For example, the beacon 410 can exclude a wireless receiver. Further, since the information of the beacon message generally does not change, security can be enhanced by restricting the ability of the beacon 410 to change the message content. The message content can be fixed at the time of manufacture, or adjusted only through physical access (e.g., a local wired connection using a specialized tool) or a beacon management app, to deter unauthorized altering of behavior of the beacon 410.

In some implementations, a master beacon is provided that controls or configures ordinary or "slave" beacons. The master beacon communicates with a set of one or more beacons at the same location, e.g., within a transmission range of the master beacon. Slave beacons may include receivers to receive the signals from the master beacon. Each business location may have a single master beacon to monitor and manage the slave beacons at the location. Instead of triggering the display of location-based messages to visitors, the master beacon can transmit configuration changes or other instructions to the nearby beacons that the master beacon is assigned to manage. The master beacon may be connected to a computer network, e.g., the Internet, while other beacons at the location may not be connected to a network. Nevertheless, in some implementations, the master beacon and slave beacons may be connected through a Wi-Fi® network, a wired network, or other network. The slave beacons may be able to transmit and receive over these network connections.

Access to the master beacon may be restricted. For example, access to the master beacon may be allowed only to the operator of the social network and/or server 420, for use in management of the collection of beacons that the operator of the social network provides to different locations. In some implementations, other users can be designated to access certain master beacons. For example, representatives of a business can be granted access to the master beacon or other beacons located at the location of the business. In some implementations, the server 420 may instruct the master beacon to make changes to the behavior of beacons, such as to reassign the beacon identifiers or other content of beacon transmissions, to change a frequency or mode of transmission, and so on.

In stage (B), the user device 404 detects the beacon message transmitted by the beacon 410. The user 402 may enter the transmitting range of the beacon 410 while carrying the user device 404. For example, the user device 404 may receive the beacon message when the user walks by a location, enters a building, enters a particular location within a building, or otherwise comes into proximity of the beacon 410.

The user device 404 can have a mobile application installed that recognizes and interprets beacons. The application can be provided by the beacon service provider or the social network provider, which in some implementations are the same organization. The application can be configured to interpret and respond to messages from any of the beacons provided by the beacon service provider. In this manner, a single application allows the user 402 to receive location-based messages from many independent businesses and locations over a large area. In addition, the application can access the social network, allowing the user 402 to receive content from the social network and take actions within the social network in connection with the location-based messages triggered by beacon messages.

The user device 404 may have an operating system that handles the detection of Bluetooth® signals generally. The mobile application can be registered with the operating system so that when speaking messages having certain characteristics are received, the operating system passes the message to the mobile application for handling. For example, the operating system can determine that the beacon message has a particular application code, business name, or other data indicating that the message corresponds to the application. The operating system may then open the mobile application, and optionally bring it to a foreground or active state, and the application can then act on the received message.

The mobile application assesses the content of the beacon message, and takes an appropriate action in response. The mobile application can be configured to contact a service system over the computer network 408 to determine which content to provide to the user 402 based on the beacon message.

In stage (C), the user device 404 sends a message 406 to the server 420 over the network 408. The message 406 can include the identifying information for the beacon 410, for example. In the illustrated example, the message 406 includes a beacon identifier "18475" that uniquely identifies the beacon 410 from among all of the other beacons that the application is designed to work with. The message 406 can state or represent a request to the server 420 for information corresponding to the beacon 410. Because the content associated with each beacon may change over time, the user device 404 may request information from the server 420 each time the user device comes into proximity of a beacon 410. In this manner, the user device 404 can provide the most current, up-to-date content assigned to be displayed when the beacon 410 is detected. That assignment of content for display does not change the beacon message from the beacon 410, and so the same beacon message may prompt the presentation of different content as the assignment of content changes dynamically throughout the day.

In the message 406 to the server 420, the user device 404 may provide other information related to the detection of the beacon message. For example, the mobile application may indicate a time of detection of the beacon message, a signal strength with which the beacon was detected, an identity of a logged in user, a device type of the user device 404 (e.g., operating system ID, whether the device 404 is a phone, a watch or other device). Each of these items of information may be used by the server 420, the application on the user device 404, or both to generate a location-based message that is appropriate for the user 402 and his current situation.

In stage (D), after the server 420 receives the message 406, the server 420 determines which content should be provided for display at the user device 404. The server 420 maintains a mapping 430 between beacon identifiers and associated content to be provided when those beacons are detected. In some implementations the content to be provided is content from the social networking platform, such as a post, image, video, or other element associated with the social networking platform for the location associated with the beacon. Business users of the social networking platform can change which social networking content is provided in response to each individual beacon. This gives the business users a very high degree of control over what different user see in response to detection of different beacons. Business users can also leverage the content of their social network profiles to quickly assign existing posts or other content for presentation in a location-based message, whether the content was previously public or private in the social network.

In the example of FIG. 4, the server 420 accesses the mapping data 430 and finds an entry 432 corresponding to the beacon identifier "18475" for the beacon 410. This entry 432 specifies that a particular post in the social networking platform, "post_023", has been designated by the business user having authority over the beacon 410 as the content to display when the beacon 410 is detected.

With the information from the mapping data 430, the server 420 accesses social network data 440 and obtains the specified post. This information is illustrated as post 442, which provides a coupon, "get 15% off your next entrée." The post 442 may include other information, such as audio, images, or video. As another example, the post 442 may include an optical machine-readable code, such as a bar code or a quick response (QR) code, that can be scanned by a business as proof of possession of the coupon, or for tracking purposes. An optical machine-readable code may be dynamically generated to include a code specific to the user 402 and/or the current visit of the user to the location.

The server 420 may obtain other content related to the post 442 to provide to the user device 404 for display. For example, comments, ratings, and indications of other social networking interactions can be included. The server 420 can also store data indicating the detection of the beacon 410 by the user device 404. For example, the server 420 may store data indicating reception of the beacon message for that particular beacon identifier in the user history associated with the mobile application and/or a user profile for the social network.

In the example of FIG. 4, the mapping data 430 assigns a single content item to the beacon 410. In some instances, businesses can assign multiple alternative content items can be assigned to a single beacon, as well as rules or conditions that determine which content is ultimately displayed to a user. As discussed further below, content provided in response to detecting a beacon can be determined based on a variety of other factors in addition to the mapping data 430. For example, interactions of the user 402 with others in the social networking platform can be used to adjust which content is displayed, or to select from among multiple options. Information in a user profile for the user 402, including a history of previous beacons detected, purchases of the user 402, preferences and interests in the user profile in the social network, and other information can be used to target content for the specific user 402. As an example, the type of offer presented may vary, or the amount of the discount may vary depending on characteristics of the user, such as whether the user 402 is a new customer, a returning customer, a user who has designated the location as a favorite, and so on.

Once content for a location-based message is selected, the message may be customized further for the user 102. For example, the main content of the message, e.g., the post 442, may be supplemented with personalized information, such as a welcome, e.g., "Welcome Sam . . . ." In some implementations, businesses specify messages with designated fields or areas that are populated with information from the social network.

In stage (E), the server 420 sends content 450 to the mobile device 404 for display through the mobile application. In this example, the server 420 sends the post 442 that was designated for display when the beacon 410 is detected. In some implementations, the server 420 may provide the content in a different manner. For example, the server 420 may provide a URL or other reference to the user device 404, and the user device 404 may contact another server or a third-party system to obtain the content to display.

In stage (F), the application on the user device 404 displays the content received from the server 420 as location-based message 460 on a user interface 462 of the user device 404. The information in the post 442 can be presented in any of multiple ways. For example the location-based message 460 may be provided as a notification through the operating system of the user device 404, such as a drop-down display area that slides down from the top of the screen. Other as another example, the mobile application can be brought to a viewable area of the display and the location-based message 460 can be presented in the mobile application, which may occupy some or all of the screen space of the user device 404. In some implementations, a business user may specify the manner in which the content should be presented. In some implementations, the location-based message is accompanied by a haptic output such as vibration, an audible notification, or a spoken version of the content may be provided through text-to-speech generated by the user device 404 for the server 420 or another system.

In some implementations, the total time between the detection of signal from the beacon 410 by the user device 404 to the display of the location-based message 460 can be short, e.g., a few seconds or less, so that the user 402 is still near the location of the beacon 410 when the location-based message 460 is presented. Even if the user 402 is has moved out of the transmitting range of the beacon 410, a user moving at typical speeds on foot will still be near the location of the beacon 410. Because the user 402 is still in proximity to the business referenced in the location-based message 460, the user 402 can immediately take advantage of the offer in the location-based message 460 if desired. In some instances, if the offer does not expire soon, the user 402 may save the offer for later use or as a reminder. In some implementations, the application providing location-based messages may provide the user 402 the ability to later review a history of locations where beacons were detected, or a set of messages that were previously shown through the application.

In some implementations, the location-based message 460 includes the post 442 and one or more interactive elements. For example, one or more buttons or other controls can be provided with the post 442 to allow the user 402 to share the post 442, comment on the post 442, invite a particular user such as a friend in the social network to meet at the location and take advantage of the offer, provide a rating for the offer or location, save or repost the post 442, or take another action. As another example, the location-based message 460 or associated content may include elements that the user 402 can interact with to contact the business associated with the beacon 410 by text message, phone call, email or other communication, visit our website for the business, designate the business as a favorite, make a reservation or purchase a ticket. A purchase or reservation may be made directly through the interface provided by the mobile application, or a link may be provided to take the user to a webpage where the purchase or reservation may be carried out.

As discussed above, the wireless beacon messages transmitted by the beacon 410 may not include the content to be displayed on the user device 404, since the content can be provided by the server 420. Nevertheless, in some implementations, at least some content to be displayed on the user device 404 in a location-based message may be included in a wireless beacon message from the beacon 410. In such implementations, that content may be supplemented with additional content from the server 420. As another example, information in a wireless beacon message from the beacon 410 may be displayed if, for example, a connection between the user device 404 to the sever 420 is not available.

In some implementations, the user device 404 may cache information for display in response to detecting of certain beacons in the future. The mobile application may use the cached information to provide content corresponding to a beacon even when a network connection from the user device 404 to the server 420 is not available. For example, if the mobile application detects the beacon 410 and determines that a connection with the server 420 is not available, the mobile application can provide information from the cached data.

The cached information may be refreshed periodically, for example after passage of a certain amount of time (e.g., every 10 minutes, every hour, or every day, etc.) or after the user's location changes by certain amount (e.g., distance or detection of a new beacon so that changes in content for beacons can be reflected in the content displayed to the user).

Various types of beacon information may be cached. For example, the mobile application on the user device 404 may store information corresponding to beacons that have been previously detected and/or for nearby beacons that have not yet been detected. The user device 404 may cache information for beacons relevant to the user, such as beacons associated with locations or organizations that the user 402 or the user's connections in the social network have visited in person or interacted with in the social networking platform (e.g., by sharing, commenting, or rating content). Information for beacons of a location or business that the user or a user's friends in the social network have designated as a favorite can be cached.

As an example, when the user device 404 detects a beacon message for a restaurant, the server 420 may identify other beacons located at the same restaurant and send the content for those beacons also. The mobile application caches the content and initially displays only the content for the detected beacon. Then, when another beacon of the same restaurant is detected, the mobile application already stores the content to be presented and may provide the cached content for the newly detected beacon. Before displaying the content, the mobile application may determine that the cached content is still valid, for example by verifying that less than a maximum amount of time has passed since the cached content was received from the server 420. As another example, messages corresponding to all beacons at a location can be obtained from the server 420 and displayed by the user device 404. The messages from all the different beacons can be displayed as separate messages, and the user 402 can choose what to do with each message.

To obtain information for the cache, the mobile application of the user device 404 may determine its location through GPS or other means and provide it to the server 420. In addition, or as an alternative, when the user device 404 sends a message indicating the identity of a nearby beacon, the server 420 can look up the location corresponding to that beacon in a database. The server 420 may send information for multiple beacons in an area around the user, for example, a batch of data indicating content for all beacons for that block, or for beacons in a particular shopping center where the user is currently located, or for beacons in a certain area, such as a one-mile radius around the user's current location. This information may include multimedia content, such as images, audio, and videos that can be displayed in response to beacon detection. As an alternative, the data to be cached can include a more compressed or limited form of information, such as text information only or HTML rather than images. The limited version can be used when certain constraints are present, such as a slow network connection or no network connection, and the user device 404 can contact the server 420 to obtain the enhanced version of the content when communication is not constrained.

Figure 5:
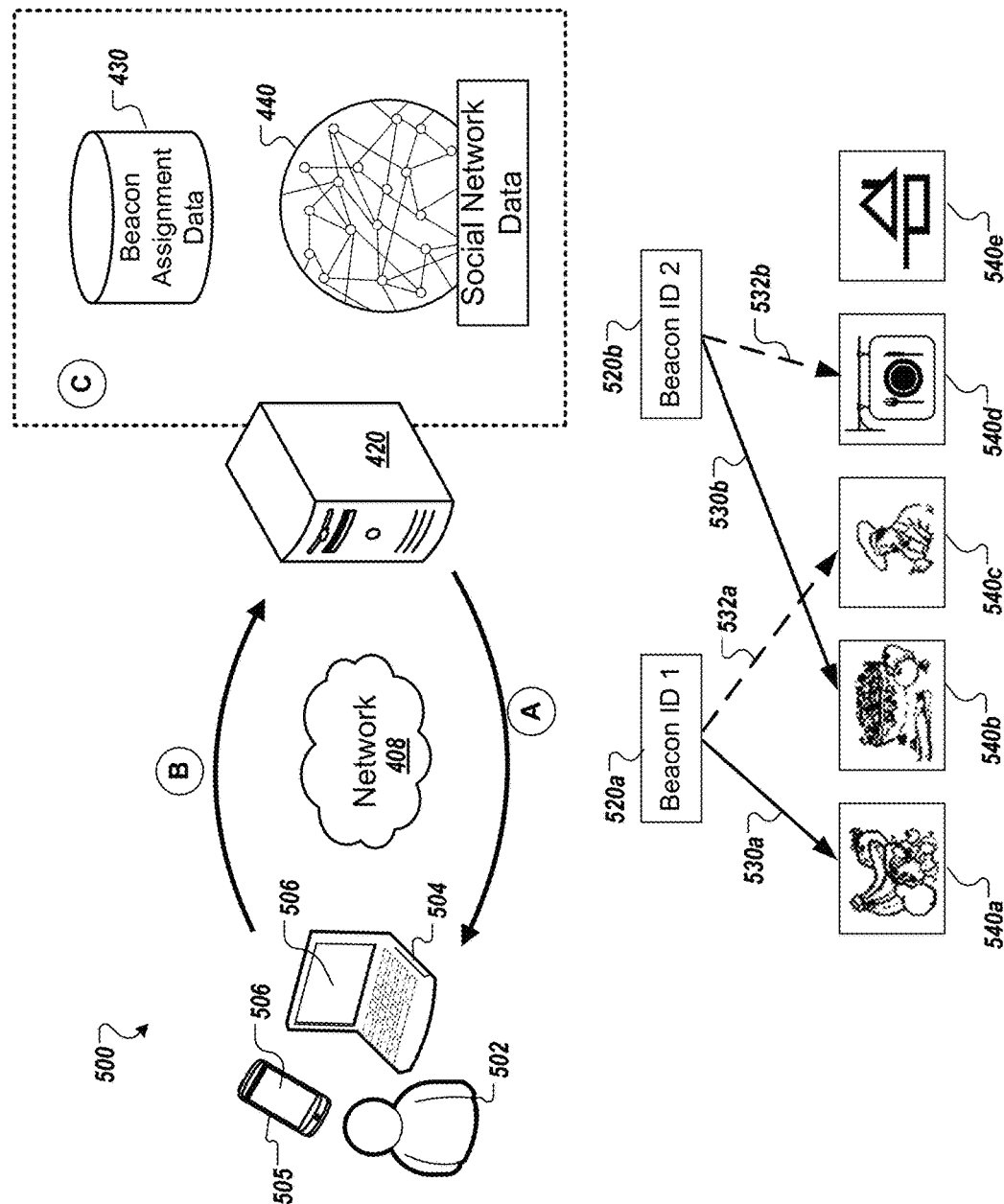
FIG. 5 is a diagram that illustrates an example of a system for managing associations between beacons and location-based messages.

Referring to FIG. 5, a system 500 allows businesses to quickly and remotely change the location-based messages presented to users. The illustrated example shows that a business can change the content of messages that are provided to those who visit, without adjusting the beacon transmitters or changing the signals the beacons provide. When a business user representing a business desires to change a location-based message, the business user can specify the new content to be provided and the beacon that should trigger the display. While the beacon continues to transmit the same message as before, e.g., providing identifying information such as a beacon identifier, the server 420 updates the mapping data 430 so that the beacon causes the new content to be provided.

The system includes the server 420 of FIG. 4, which communicates with a computing device 504 over the network 408. The user of the computing device 504 is a business user of the social network, for example, a representative of a business, such as an owner, manager, or other person with authority for the business location. FIG. 5 shows steps (A)-(C) which show a flow of data as the business user changes the content of a location-based message provided in response to a beacon at his business location.

In stage (A), the server 420 provides data for a user interface 506 for changing the association between a beacon and message content for location-based messages. As an example, the server 430 may provide a web page that shows the user interface 506 when rendered. As another example, the user interface 506 may be provided by an application on the computing device 504, and the server 420 can provide data indicating current assignments of content to beacons, social network posts, and other information used by the application to generate the user interface 506.

The user interface 506 may be provided for display on any of multiple computing platforms. For example, the computing device 504 may be a desktop computer, a laptop computer, a tablet computer, a phone, a watch or other wearable device, and so on. In some implementations, the user interface 506 is available through the same channels that can be used to access the social network. Thus, by logging into the social network from any device, and through a web page, application, or other means, the business user 502 gains access to the user interface 506 for managing the messages provided when beacons are detected. For example, the user interface 506 may be provided on a mobile device 505, and may be accessed through multiple devices, e.g., both devices 504 and 505.

In stage (B) the business user selects content to provide as a location-based message for one or more beacons. First, the business user can be required to demonstrate authorization to access the beacon management interface, for example, by logging in with the appropriate credentials. In some implementations, certain business users of the social network can have or be delegated authority over certain beacons, and that information can be linked to their profiles in the social network. In some implementations, a business or a particular business location has its own social network profile, and the profile for the business location is used to adjust the user experience upon detection of one of the beacons at the location.

The user interface 506 can indicate a number of items of content in the social network that the business user can choose from. For example, the user interface 506 can show or list content that has been posted or entered into the social network under the social network profile for the business. This allows the business user to quickly select existing content that is available to immediate use. A post or other social network content item can also be edited by the user 502 using the user interface 506 or another interface before being designated for use in a location-based message.

Content for several categories of content items in the social network can be shown. Examples of categories of content in the social network include posts of the business, events of the business, and job openings for the business. These can be selected or ranked within each category according to popularity, timing, or other factors. For example, the user interface 506 can show a certain number of items, e.g., the top 5 or top 10 most popular or recent content items of the business in the social network. The content items can be publicly viewable on the social network, or may be drafts or posts where viewing in the social network is limited.

Figure 6:
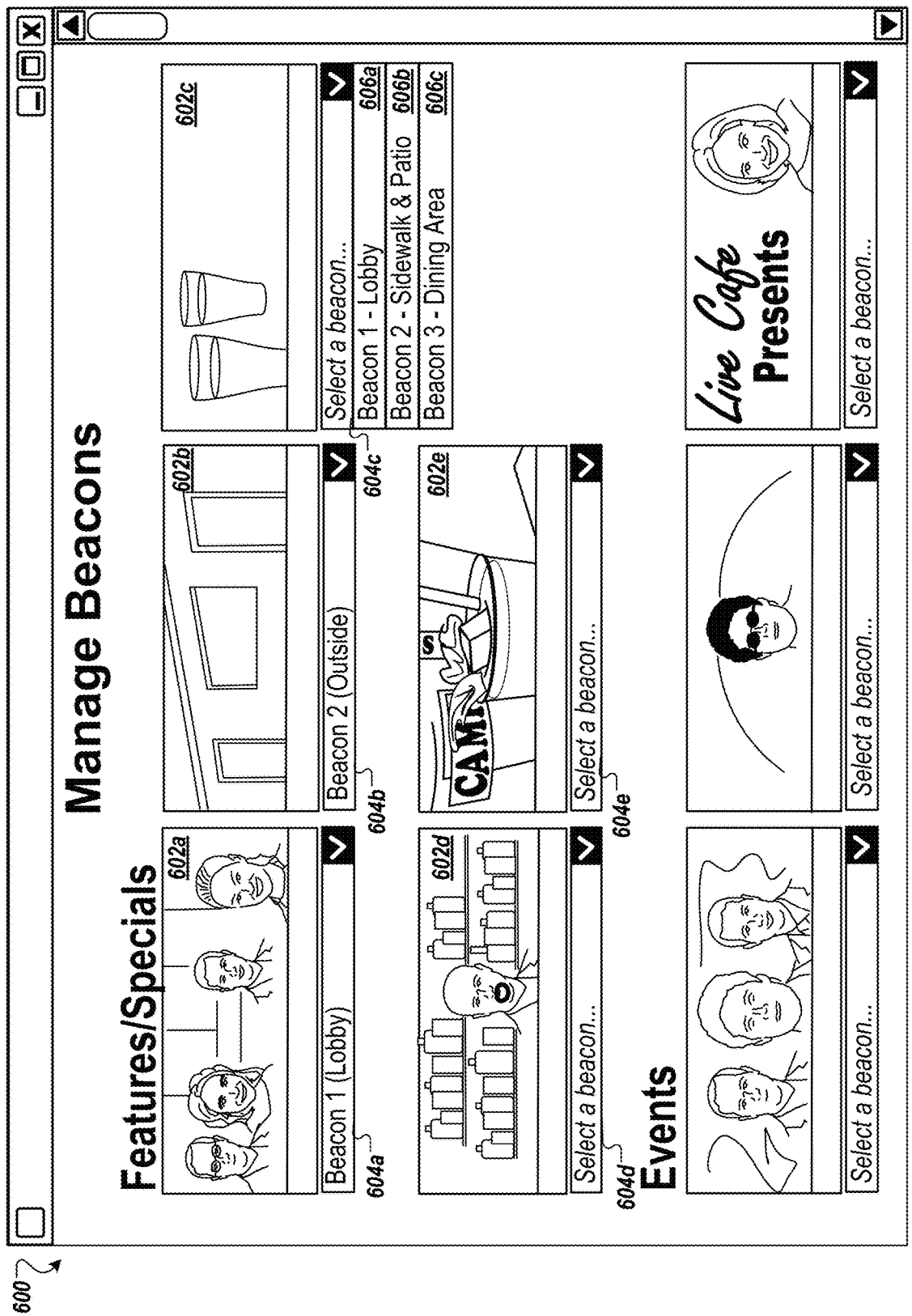
FIG. 6 is a diagram that illustrates an example of a user interface for managing associations between beacons and location-based messages.

Using the interface 506, the business user 502 can designate the content for each beacon at the business location. That is, rather than changing the actual wireless message transmitted by a beacon, the business user 502 can use the user interface 506 to associate content with each beacon, so that the server 420 provides the designated content when a user device requests the content for the particular beacon. The management of the location-based messages for the beacons occurs separate from the beacon hardware and settings, which avoids the need for a location owner or other person to adjust the beacon transmitter devices. The beacons themselves are essentially maintenance-free, and changing the messages that visitors see can be done easily using the user interface 506. An example of an interface 506 for designating content for location-based messages is shown in FIG. 6, discussed below.

In stage (C), the server 420 receives the user input that the business user 502 provided through the user interface 506. For example, the server 420 receives data indicating the selections that the business user 502 made for the beacons at the user's business location. The server 420 then updates the mapping data 430 that associates beacons and content to be provided in location-based messages. Changes that the business user 502 makes can take effect immediately. For example, once the mapping data 430 is updated, a user device that requests content corresponding to a beacon will receive the content that was most recently designated for that beacon.

The change to the mapping data 430 is conceptually illustrated as associations 530*a*-530*b* and 532*a*-532*b* between beacon identifiers 520*a*-520*b* and social network posts 540*a*-540*e*. The beacon identifiers 520*a*-520*b* correspond to two different beacons at a location managed by the business user 502. Initially, the beacon identifier 520*a* is associated with post 540*a*, and the beacon identifier 520*b* is associated with post 540*b*. The business user 502 changes the associations using the user interface 506, so that the beacon identifier 520*a* becomes associated with post 540*c*, and the beacon identifier 520*b* is associated with post 540*d*. By simply changing the associations in the mapping data 530, the server 420 can update the arrangement of the system to provide the newly specified posts when the beacons are detected. Other posts, such as the post 540*e*, may not yet have been associated with any beacons, and so will not be provided in response to detection of beacon messages. However, the interface 506 can allow the business user 502 to dynamically change the associations so any existing post or a new post, or other content, can be designated to be provided in response to detection of a beacon.

While various examples show a beacon being associated with a single post, beacons are not limited to a one-to-one association. For example, multiple posts can each be associated with a single beacon identifier. When the application of a user device sends a request to the server 420 that includes the beacon identifier, the server 420 can send multiple posts or content items. As another example, the business user 502 may specify rules for selecting among multiple different posts or messages associated with a beacon. For example, one associated post may be provided to certain users that have a particular characteristic in their social network profiles, and a different message may be provided to users that do not have the characteristic. In some implementations, no message may be provided. For example, a business user may designate a job posting as the content to provide after a beacon is detected, but that only service professional users of the social network should receive the message, since others are much less likely to be interested. As a result, people with service professional user profile types may be provided the message when they approach the beacon, while other users may not be provided any message by the server 420 in response to detecting the same beacon. Of course, the content that is associated with a beacon is not limited to content of the social network either. Users may specify content from other sources, or enter new content directly to associate with a beacon.

The techniques shown in FIG. 5 that allow a user to customize the content shown for the beacons at a location can be performed for many different users and many different locations. For example, many different independently owned and operated businesses or locations can separately log in to their social network profiles and configure the content provided once their beacons are detected. The information for many different locations may be stored in the mapping data 430, allowing the server 420 to aid in the management of many beacons dispersed over a large area.

Referring to FIG. 6, a user interface 600 shows an example of one view that a business user may see when updating associations of beacons and location-based message content. In the user interface 600, social networking posts for a business are shown in several categories, such as features/specials posts (e.g., indicating temporary offerings, coupons, discounts, or other promotions), event posts (e.g., occurring at the location or a related place), job posts (e.g., current openings that the business is attempting to fill. The top five posts in each category are displayed for potential assignment to a beacon.

In FIG. 6, the "features/specials" category of posts includes five posts 602a-602e. In general, a post may include text, but may also include other content, such as images, videos, audio data, and icons or other graphics. Below each of the posts 602a-602e is a drop-down menu 604a-604e that allows a user to select a beacon at the location to associate with the post 602a-602e. The drop-down menu 604a shows that a beacon called "Beacon 1," which transmits in a lobby area, has been associated with the post 602a. As a result, when users enter the lobby and their devices detect the beacon message from this beacon, the server 420 will send the post 602a for display in a location-based message in response. The post 602a may be potentially provided with additional content, such as comments, ratings, interactive controls, etc. The post 602b has been associated with "Beacon 2," which transmits to an area outside the business. As a result, detection of "Beacon 2" by a device will cause the server 420 to send the post 602b for display at the device.

The drop-down menu 604c is shown in an expanded state, with options 606a-606c to select any of the three beacons that are located at the business location. For example, with the first two beacons already associated with posts 602a, 602b respectively, the user can select "Beacon 3," which transmits to a dining area, to associate the beacon with the post 602c. Selecting the option 606c causes the server 420 to save the association, so that when a user device detects that beacon, the server 420 will provide the post 602c for display on the user device. Changes to the associations of beacons and corresponding content can be made in real time, in some instances, within a few minutes or a few seconds of a business user indicating a change using the user interface 600.

Although the example of FIG. 6 shows an ability to assign a beacon to a post, the process of associating beacons and content can operate in other ways. For example, the user interface 600 may allow a user to select a post from a drop-down list to associate with a beacon. As another example, the user interface 600 may provide an area where a user can drag and drop a post to a particular beacon, select a beacon after scrolling through a list, or otherwise select one or more social network content items. In some implementations, the business user may enter new content through the user interface 600 to associate content with a beacon that is not yet in the social network.

In some implementations, posts in the social network are assigned an identifier, so that so comments and other interactions remain linked to the post in the social network. The same identifiers for social network content can be used when posts are provided in location-based messages, so that interactions with the location-based messages are tracked in the same manner. For example, comments entered to a location-based message for a post, and comments entered through the social network for the same post, can be aggregated. Users who subsequently view the post, whether in a location-based message or in the social network, will see the comments submitted through either interface.

Referring to FIG. 7, a table 700 shows an example of association data that the server 420 may store, update, and use to provide location-based messages. The association data may be provided in any appropriate form, and the table format is used simply for clarity in illustration.

The table 700 includes records 702a-702c corresponding to different beacons, as indicated by the different beacon identifier values. The table 700 indicates, for each beacon, content to be provided in response to the detection of the beacon. For example, the record 702a indicates that a social network post, "post_6847," should be provided by the server 420 when the corresponding beacon is detected. The record 702b indicates that two content items, "post_932" and "post_832," should be shown in response to detection of the beacon with identifier "3249." The content to be provided can be designated in any appropriate manner, e.g., using identifiers for content in the social network, by including text or content in the association data, and so on. The record 702c indicates that content obtained at a certain URL, "www.example.com/message," should be provided when the corresponding beacon is detected. This URL may refer to content that is within the social network or outside the social network.

When a user designates a change in the content to be provided for a beacon, the server 420 updates the record for the beacon to indicate the new content to be provided. Similarly, the association data can be used when a user device notifies the server 420 that a beacon has been detected. The server 420 receives the beacon identifier for the detected beacon, and looks up the record that matches the beacon identifier. The server 420 then obtains the content indicated by the record and provides it to the user device. The retrieval of information can be performed quickly so the content is obtained and presented while the user is still in proximity of the beacon. In some instances, the user device may still be within the transmission range of the beacon, although the message may still be provided if the user device has moved outside the transmission range of the beacon.

The table 700 shows that the association data can indicate other data associated with the beacons, such as the locations where the beacons are located and organizations or businesses associated with the beacons. This information may facilitate searching for all beacons, and their message content, that are associated with a given location or organization.

The table 700 can indicate authorized users that have authority to change the content or other parameters for a beacon. For example, authorized user can be identified by a username for their social network profiles. The server 420 can require users to log in with an authorized social network profile before allowing the associations of beacons and content can be changed. For example, the server 420 may not permit access to a beacon management interface until a user authenticates with an authorized social network profile. In addition, within the beacon management interface, information may be provided for the specific set of beacons that the user is authorized to manage, so that a user cannot view or alter information for other beacons.

In some implementations, a business user may specify the manner in which a location-based message should be displayed. For example, the business user may select, using a beacon management interface, from among multiple different ways to communicate the content of a location-based message. For example, the business user may specify whether detection of a beacon should trigger (i) a notification on a user's mobile device, e.g., through the operating system of the phone, (ii) a display of content through an application on the mobile device, (iii) a display of information through the social network, such as adding the message to the user's "moments" view, "events" view, or other social network feed, (iv) transmission of content through another communication channel, such as an e-mail or SMS text message, and so on. A business user may specify that the message should be provided through multiple communication channels, such as a message immediately displayed on the mobile device as a notification or application view, and also as a message in the social network that the user can view later.

Other types of information can also be specified by business users and stored in the association data of table 700 to customize the experience provided to users in response to detection of specific beacons.

Figure 8:
FIG. 8 is a diagram that illustrates a user interface for setting rules to customize location-based messages associated with a beacon for different situations.

Referring to FIG. 8, a beacon management interface can include a user interface 800 that permits a business user to specify multiple messages to be associated with a single beacon. The business user may set conditions for the display of different messages to target the content of location-based messages to users having certain characteristics. For example, the user interface 800 allows a business user to set different message content to be provided when different conditions are met. In the general case, detection of the beacon triggers the display of one item, "Post 1," from the social network. However, if the server 420 determines that a visitor has visited the location previously, another item, "Post 2," is provided, in addition to or instead of the general message. If the server 420 determines that the visitor is a frequent customer, yet a different item, "Post 3," is provided, in addition to or instead of the general message. In this manner, different content is shown to different users in response to detection of the same beacon message. When providing content, the server 420 can access social network profiles, beacon detection logs, and other data to determine which conditions are satisfied, and thus which messages should be provided to a specific user.

The user interface 800 allows the business user significant flexibility to customize which messages are shown to specific types of users. The user interface 800 allows the business user to designate different messages for different combinations of user characteristics. For example, a restaurant configure associations of messages and beacons to send a message about a new seafood dish only to users whose social network profiles indicate a preference for seafood. The business user may select conditions from among a pre-defined set of conditions. In addition, or as an alternative, the business user may define a new condition, such as one or more user characteristics or contextual factors. Example of elements that can be used to define a condition include, for example, activity in the social network (e.g., mentions of certain keywords in a user's social network posts or comments), social network profile information, an amount of time at the location, a history of beacons detections, etc.

Figure 9:
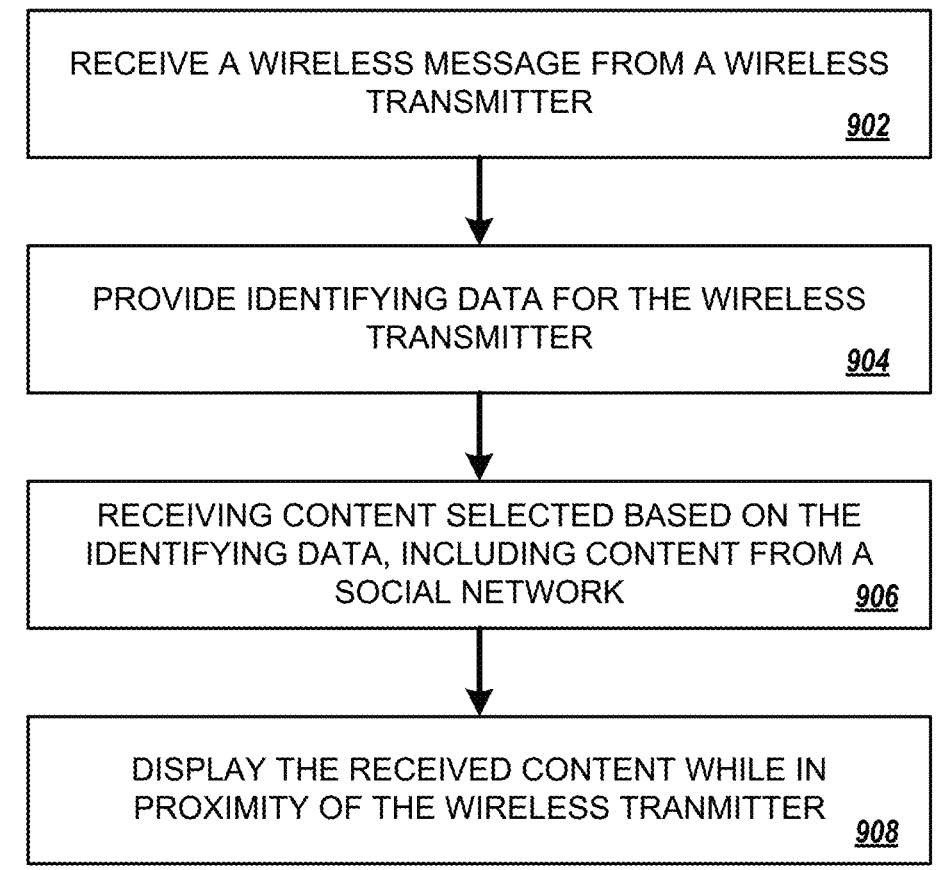
FIGS. 9 and 10 are flow diagrams that illustrate examples of methods of providing location based messages.

FIG. 9 is a flow diagram that illustrates an example of a process 900 for providing location-based messages. The process 900 may be performed by a mobile device, such as the user device 404 of FIG. 4. The process 900 can include any of the features discussed above, including those discussed with respect to FIGS. 1-4.

In step 902, a mobile device receives a wireless message from a wireless transmitter. The wireless message including identifying data that identifies the wireless transmitter. In step 904, the mobile device sends the identifying data for the wireless transmitter to a server system over a network. In step 906, the mobile device receives content from the server system over the network. The content is selected based on the identifying data for the wireless transmitter, and at least a portion of the content is from a social network. In step 908, the mobile device displays the received content while the mobile device is in proximity of the wireless transmitter.

In some implementations, the mobile device is in proximity of the wireless transmitter when the mobile device is within a maximum distance of the wireless transmitter, such as within 100 feet of the wireless transmitter. The system can be designed to display the content within another distance range, e.g., within 50 feet or within 25 feet of the wireless transmitter. A minimum level of proximity that a mobile device should be to the transmitter when the content is displayed may be set for individual beacons, or for the system generally, according to signal strength at which the mobile device detects signals from the wireless beacon or another measures of distance. In some implementations, the content is displayed while the mobile device is within a transmitting range of the wireless transmitter, e.g., within an area where the mobile device can still detect and receive signals transmitted by the wireless transmitter.

Figure 10:
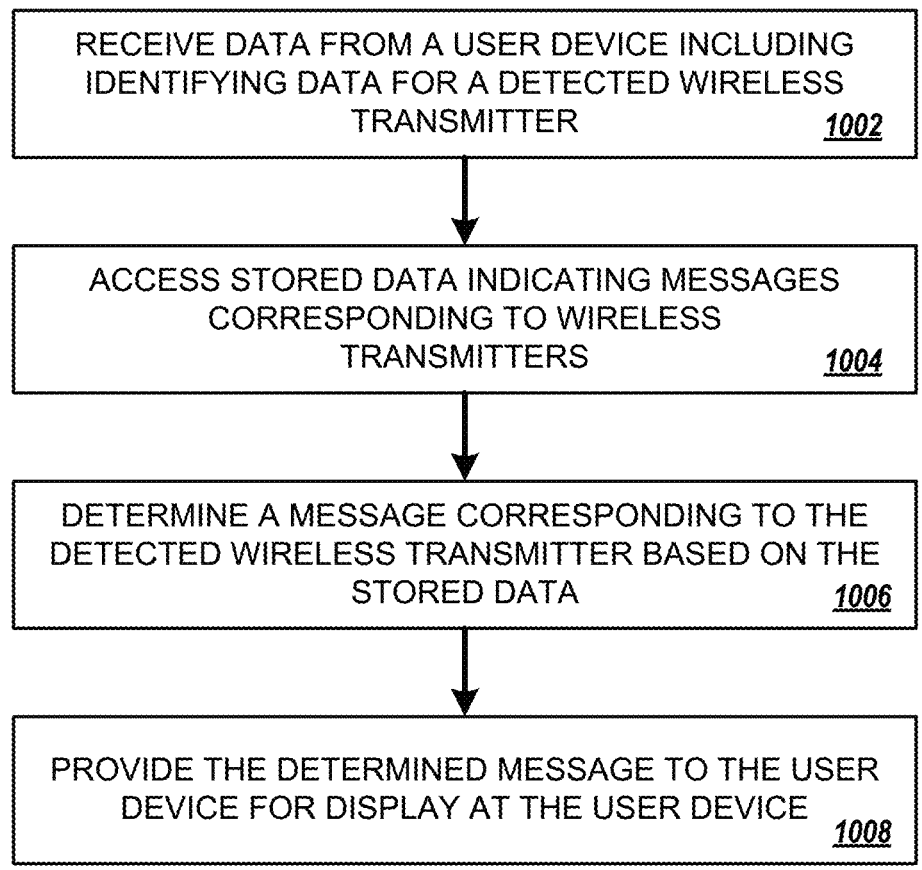

FIG. 10 is a flow diagram that illustrates an example of a process 1000 for providing location-based messages. The process 1000 may be performed by one or more computers, such as the server 420 of FIGS. 4 and 5. The process 1000 can include any of the features discussed above, including those discussed with respect to FIGS. 1-4.

In step 1002, one or more computers receive data from a user device. The data includes identifying data for a wireless transmitter detected by the user device. In step 1004, the one or more computers access data indicating messages corresponding to wireless transmitters. For examples the stored data can indicate content that business users have specified to be provided in location-based messages when corresponding beacons are detected. In step 1006, the one or more computers determine a message corresponding to the detected wireless transmitter. For example, using the stored data, the message that a business user has specified to be presented when the wireless transmitter is detected is selected. In step 1008, the determined message is provided to the user device for display. For example, the message corresponding to the detected wireless transmitter can be provided over a computer network to the user device. The process 1000 can include other operations and features as described above.

Figure 11:
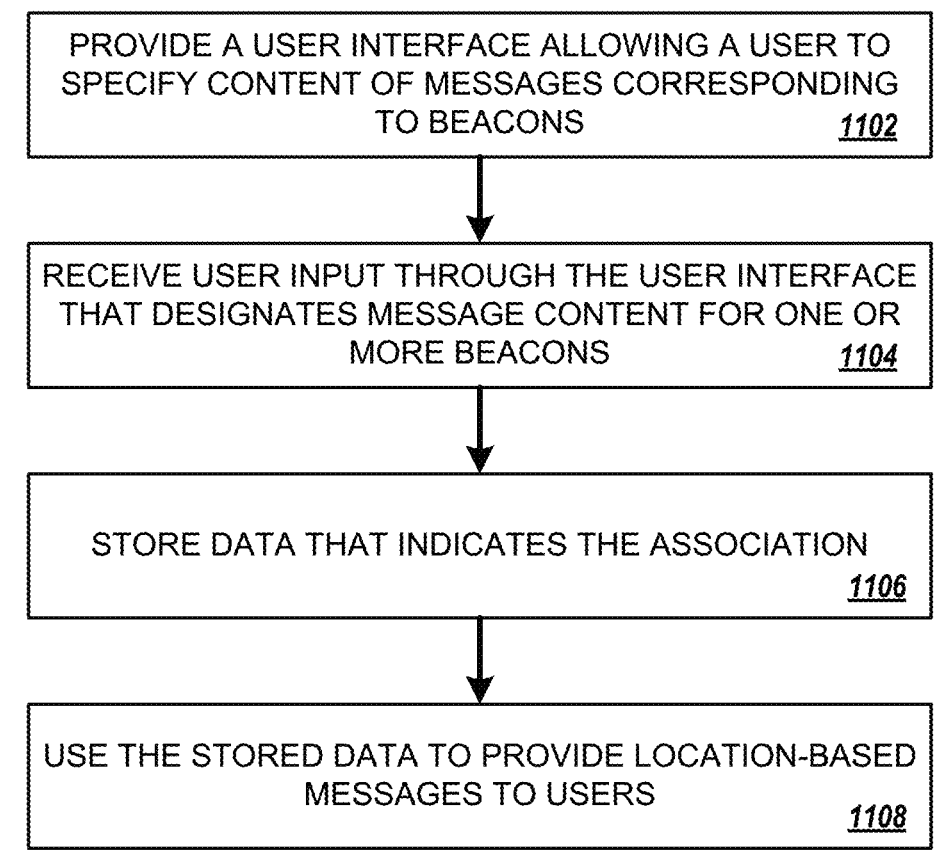
FIG. 11 is a flow diagram that illustrates an example of a method of setting associations between beacons and location-based message.

FIG. 11 is a flow diagram that illustrates an example of a process 1100 for providing location-based messages. The process 1100 can be used to allow a business user to change the content of messages provided in response to detection of a beacon. The process 1100 may be performed by one or more computers, such as the server 420 of FIGS. 4 and 5.

The process 1100 can include any of the features discussed above, including those discussed with respect to FIGS. 5-8.

In step 1102, a user interface is provided that allows a user to specify content of message corresponding to beacons. For example, the interface can allow a user to specify the content to be provided to a user device over a network in response to detection of a beacon message by the user device over a short-range wireless interface. In step 1104, user input is received through the user interface. The user designates message content to be provided in response to the detection of one or more beacons. In step 1106, data is stored to indicate the association of a beacon and the designated message content. In step 1108, the stored data is used to provide location-based messages to one or more users. For example, when a particular beacon is detected, the message content for the particular beacon is identified from the stored data. The process 1100 can include other operations and features as described above.

Figure 12:
FIG. 12 is a flow diagram that illustrates an example of a method for configuring one or more beacons using a master beacon.

FIG. 12 is a flow diagram that illustrates an example of a process 1200 for configuring one or more beacons using a master beacon. The process 1200 can include any of the features discussed above, including those discussed with respect to FIGS. 3 and 4.

In step 1202, a master beacon receives data indicating a configuration change to be made to a slave beacon. The master beacon may be a device with a wireless transmitter that is assigned to manage one or more slave beacons. The slave beacons may be configured to accept commands from the master beacon, and in some implementations, only from a single master beacon. The master beacon can receive data indicating a configuration change for a slave beacon over a network, for example, from a server system over the Internet. The configuration change may be directed for a single, specific slave beacon, or for multiple slave beacons.

The configuration change can change the operation of the slave beacon, for example, by changing content that a slave beacon transmits, changing a frequency channel on which the slave beacon transmits, changing how frequently the slave beacon re-transmits its message, changing a power level with which the slave beacon transmits, changing which of multiple communication protocols the slave beacon uses for transmissions, to enable or disable transmission of the slave beacon, and so on.

In step 1204, the master beacon generates a message that instructs a change in the behavior of the slave beacon. For example, the master beacon may form a message that is directed to a specific slave beacon. The master beacon may store, or may receive from a server system, a code or key that allows the master beacon to communicate with or change settings of the slave beacon. With the code or key, using encryption or other techniques, the master beacon may generate a secure message that is recognized and accepted by the slave beacon to which it is directed. When a configuration change applies to multiple slave beacons, the master beacon may transmit a different message for each slave beacon to be configured, or may send a message that designates multiple slave beacons to receive the change. In step 1206, the master beacon transmits the message to the slave beacon. For example, the master beacon may transmit the message using a direct short-range wireless communication protocol, such as Bluetooth®, Wi-Fi®, NFC, and so on.

In some implementations, slave beacons that detect a message from the master beacon determine whether the message applies to them. For example, each slave beacon can compare an address or code in a configuration message and determine whether it matches the address or code for the slave beacon, and only apply the configuration change if the values are determined to match. As another example, a slave beacon may only apply the configuration specified if the configuration message is encrypted with an encryption key of the slave beacon, and thus the slave beacon can decrypt the configuration message.

Once a slave beacon receives a configuration message from the master beacon that is directed to it, the slave beacon applies the change instructed by the configuration message. The slave beacon may optionally send an acknowledgement of receipt of the configuration message back to the master beacon, and/or send an acknowledgment that the instructed change has been made. The master beacon may send an acknowledgement of the change to the slave beacon to the server that provided the information instructing the change to be made. If errors occur, such as the slave beacon fails to acknowledge, or if the requested change cannot be made, status messages can be provided, from the slave beacon to the master beacon and/or from the master beacon to the server system, to indicate the nature of the error or provide other status information.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:

providing, by the one or more computers, user interface data over a communication network to a first user device of a first user of a social network whose user account for the social network is associated with a wireless transmitter, the user interface data causing the first user device to display a user interface that (i) shows multiple posts of the user account of the first user in the social network and (ii) includes one or more controls enabling the first user to select a post, from among the multiple posts, and assign the selected post to be provided to user devices that detect wireless messages from the wireless transmitter;

receiving, by the one or more computers, a message over the communication network from the first user device of the first user of the social network, the message being sent by the first user device in response to interaction with the one or more controls of the user interface, the message designating a user-selected post in the social network that was selected, from among the multiple posts shown on the user interface, to be provided to devices that detect transmissions from the wireless transmitter associated with the user account of the first user, wherein the wireless transmitter has an identifier, and the wireless transmitter is configured to transmit wireless messages that include the identifier;

in response to receiving the message from the first user device, and without altering the messages transmitted by the wireless transmitter, changing social network content that the one or more computers provide to user devices that detect wireless messages from the wireless transmitter by storing, by the one or more computers, mapping data that (i) associates the identifier for the wireless transmitter with the user-selected post in the social network and (ii) assigns the user-selected post for presentation to at least some devices that detect the wireless transmitter and provide the identifier for the wireless transmitter;

receiving, by the one or more computers, data sent by a second user device of a second user of the social network, the received data including data from a wireless message that was transmitted by the wireless transmitter and was received by the second user device while the second user device was in proximity to the wireless transmitter, the received data including the identifier for the wireless transmitter detected by the second user device;

accessing, by the one or more computers, stored mapping data that indicates messages corresponding to wireless transmitters at different locations, wherein the stored mapping data associates individual posts in the social network with the respective wireless transmitters;

determining, by the one or more computers, a message corresponding to the wireless transmitter based on the stored mapping data, wherein determining the message comprises:

determining, based on the mapping data, that the identifier for the wireless transmitter is associated with the user-selected post in the social network that was selected from among the multiple posts shown on the user interface; and including the user-selected post in the social network in the message corresponding to the wireless transmitter; and in response to receiving the data sent by the second user device that includes the identifier for the wireless transmitter, providing, by the one or more computers, the determined message that includes the user-selected post in the social network to the second user device over the communication network, the determined message being provided for display at the second user device while the second user device is in sufficient proximity to the wireless transmitter to receive wireless messages from the wireless transmitter.

2. The method of claim 1, wherein the stored mapping data includes data that specifies, for each of multiple users of the social network, content in the social network that the user of the social network has designated to be presented on user devices in response to detection of a signal from a wireless transmitter associated with the user of the social network.

3. The method of claim 1, wherein the wireless transmitter is a radiofrequency transmitter, and wherein receiving the data sent by the second user device comprises receiving data included in a transmission from the radiofrequency transmitter to the second user device.

4. The method of claim 1, wherein receiving the data sent by the second user device comprises receiving a user identifier for a second user of the second user device; and wherein determining the message comprises determining a portion of the message based on the user identifier for the second user of the second user device.

5. The method of claim 1, wherein determining the message comprises including, in the message, information customized for a second user of the second user device based on user profile information for the second user of the second user device from a user profile in the social network.

6. The method of claim 1,
wherein determining, by the one or more computers, the message corresponding to the wireless transmitter based on the stored data comprises:
obtaining content indicating an offer provided by the first user that is a member of the social network; and
obtaining a comment or rating from the social network regarding the offer, the location, or first user; and
wherein providing the determined message comprises providing the content indicating the offer and the comment or rating.

7. The method of claim 6, wherein obtaining the comment comprises selecting, as the comment, a text comment provided by a third user of the social network, the text comment being selected based on a relationship in the social network between the second user and the third user of the social network.

8. The method of claim 1, further comprising providing data causing the second user device to display, with the determined message, at least one interactive control configured to initiate an action in the social network responsive to user interaction with the at least one interactive control.

9. The method of claim 1, wherein the wireless transmitter is located at a location of a business; and
wherein providing the data for the user interface comprises providing data for a user interface having one or more interactive elements to designate a post associated with a profile in the social network as a message to be displayed in response to detection of the signal from the wireless transmitter.

10. The method of claim 1, wherein the user-selected post in the social network is a first post;
wherein the method further comprises, after providing the determined message to the second user device for display:
providing, over the communication network, data for a user interface that enables a user, whose user account for the social network is associated with the wireless transmitter, to select a post from among multiple posts associated with the user account and assign the selected post to be provided to user devices when the user devices detect one of the wireless messages from the wireless transmitter.

11. The method of claim 10, further comprising, after providing the data for the user interface:
receiving, over the communication network, data indicating a user selection of a second post in the social network through the user interface, the second post in the social network being different from the first post;
after receiving the data indicating the user selection of the second post, receiving data sent by a third user device indicating that the third user device detected a wireless message from the wireless transmitter; and
in response to receiving the data indicating the user selection of the second post in the social network, and without altering the wireless message from the wireless transmitter, providing the second post, instead of the first post, for display at the third user device in response to the third user device that detected the wireless message from the wireless transmitter.

12. The method of claim 1, wherein the user interface data defines a user interface that displays the multiple posts, each of the multiple posts having an associated drop-down control in the user interface, wherein each of the drop-down controls indicates wireless transmitters associated with the user account of the first user, wherein selection of one or more of the wireless transmitters with one of the drop-down controls assigns the post associated with the drop-down control to be presented to other devices that detect the wireless transmitter selected using the drop-down control.

13. The method of claim 1, wherein the user-selected post is a first user-selected post;
wherein the user interface data causes the user interface to include controls for the first user to assign posts to transmitters so that, for detection of the same one or more messages of the wireless transmitter, different posts are provided in response to different conditions being met;
wherein the method further comprises:
receiving, from the first user device, (i) data designating the first user-selected post to be provided in response to detection of a message from the wireless transmitter with a first condition being satisfied, and (ii) designating a second user-selected post to be provided instead of the first user-selected post in response to detection of a message from the wireless transmitter with a second condition being satisfied; and
updating the mapping data to (i) associate the identifier for the wireless transmitter with the first user-selected post and the second user-selected post, (ii) assign the first user-selected post for presentation to devices that detect one of the messages of the wireless transmitter when the first condition is satisfied, and (iii) assign the second user-selected post for presentation to devices that detect one of the messages of the wireless transmitter when the second condition is satisfied.

14. A system comprising:
one or more computers and one or more computer-readable media storing instructions that, when executed by the one or more computers, cause the one or more computers to perform operations comprising:
providing, by the one or more computers, user interface data over a communication network to a first user device of a first user of a social network whose user account for the social network is associated with a wireless transmitter, the user interface data causing the first user device to display a user interface that (i) shows multiple posts of the user account of the first user in the social network and (ii) includes one or more controls enabling the first user to select a post, from among the multiple posts, and assign the selected post to be provided to user devices that detect wireless messages from the wireless transmitter;
receiving, by the one or more computers, a message over the communication network from the first user device of the first user of the social network, the message being sent by the first user device in response to interaction with the one or more controls of the user interface, the message designating a user-selected post in the social network that was selected, from among the multiple posts shown on the user interface, to be provided to devices that detect transmissions from the wireless transmitter associated with the user account of the first user, wherein the wireless transmitter has an identifier, and the wireless transmitter is configured to transmit wireless messages that include the identifier;
receiving, by the one or more computers, one or more messages indicating input to the user interface that specifies a user-selected progression of different messages to be provided over time to devices that repeatedly detect messages from the wireless transmitter in a visit that extends for at least a predetermined period of time;
in response to receiving the message from the first user device, storing, by the one or more computers, mapping data that (i) associates the identifier for the wireless transmitter with the user-selected post in the social network and (ii) assigns the user-selected post for presentation to at least some devices that detect the wireless transmitter and provide the identifier for the wireless transmitter;
receiving, by the one or more computers, data sent by a second user device of a second user of the social network, the received data including data from a wireless message that was transmitted by the wireless transmitter and was received by the second user device while the second user device was in proximity to the wireless transmitter, the received data including the identifier for the wireless transmitter detected by the second user device;
accessing, by the one or more computers, stored mapping data that indicates messages corresponding to wireless transmitters at different locations, wherein the stored mapping data associates individual posts in the social network with the respective wireless transmitters;
determining, by the one or more computers, a message corresponding to the wireless transmitter based on the stored mapping data, wherein determining the message comprises:
determining, based on the mapping data, that the identifier for the wireless transmitter is associated with the user-selected post in the social network that was selected from among the multiple posts shown on the user interface; and
including the user-selected post in the social network in the message corresponding to the wireless transmitter; and
in response to receiving the data sent by the second user device that includes the identifier for the wireless transmitter, providing, by the one or more computers, the determined message that includes the user-selected post in the social network to the second user device over the communication network, the determined message being provided for display at the second user device while the second user device is in sufficient proximity to the wireless transmitter to receive wireless messages from the wireless transmitter;
after providing the determined message, receiving, by the one or more computers, additional messages indicating that the second user device remains in proximity of the wireless transmitter for at least the predetermined period of time; and
in response to determining, based on the additional messages, that the second user device remains in proximity of the wireless transmitter for at least the predetermined period of time, providing, by the one or more computers and to the second user device, one or more additional messages in the user-selected progression of different messages.

15. The system of claim 14, wherein the wireless transmitter is a radiofrequency transmitter, and wherein receiving the data sent by the second user device comprises receiving data included in a transmission from the radiofrequency transmitter to the second user device.

16. The system of claim 14, wherein receiving the data sent by the second user device comprises receiving a user identifier for a second user of the second user device; and
   wherein determining the message comprises determining a portion of the message based on the user identifier for the second user of the second user device.

17. The system of claim 14, wherein the one or more computers are configured to customize content of messages provided in response to detection of the message from the wireless transmitter based on whether a user of a device that detects one of the messages of the wireless transmitter has submitted posts or comments in the social network that include one or more predetermined keywords.

18. The system of claim 14, wherein the one or more computers are configured to customize content of messages provided in response to detection of the message from the wireless transmitter based on whether a user of a device that detects one of the messages of the wireless transmitter has designated a location as a favorite in the social network.

19. The system of claim 14, wherein the user interface data defines a user interface that displays the multiple posts, each of the multiple posts having an associated drop-down control in the user interface, wherein each of the drop-down controls indicates multiple different wireless transmitters associated with the user account of the first user, wherein the selection of one or more of the multiple different wireless transmitters with one of the drop-down controls assigns the post associated with the drop-down control to be presented to other devices that later detect the one or more wireless transmitters selected using the drop-down control; and
   wherein the operations further comprise providing, by the one or more computers and to the first user device, user interface data that defines a second user interface that includes one or more controls that make transmission of messages by the one or more computers to user devices conditional on the presence of a combination of multiple user characteristics or contextual factors selected using the one or more controls of the second user interface.

20. One or more non-transitory computer-readable media storing instructions that, when executed by one or more computers, cause the one or more computers to perform operations comprising:
   providing, by the one or more computers, user interface data over a communication network to a first user device of a first user of a social network whose user account for the social network is associated with a wireless transmitter, the user interface data causing the first user device to display a user interface that (i) shows multiple posts of the user account of the first user in the social network and (ii) includes one or more controls enabling the first user to select a post, from among the multiple posts, and assign the selected post to be provided to user devices that detect wireless messages from the wireless transmitter;
   receiving, by the one or more computers, a message over the communication network from the first user device of a first user of the social network, the message being sent by the first user device in response to interaction with the one or more controls of the user interface, the message designating a user-selected post in the social network that was selected, from among the multiple posts shown on the user interface, to be provided to devices that detect transmissions from the wireless transmitter associated with the user account of the first user, wherein the wireless transmitter has an identifier, and the wireless transmitter is configured to transmit wireless messages that include the identifier;
   in response to receiving the message from the first user device, and without altering the messages transmitted by the wireless transmitter, changing social network content that the one or more computers provide to user devices that detect wireless messages from the wireless transmitter by storing, by the one or more computers, mapping data that (i) associates the identifier for the wireless transmitter with the user-selected post in the social network and (ii) assigns the user-selected post for presentation to at least some devices that detect the wireless transmitter and provide the identifier for the wireless transmitter;
   receiving, by the one or more computers, data sent by a second user device of a second user of the social network, the received data including data from a wireless message that was transmitted by the wireless transmitter and was received by the second user device while the second user device was in proximity to the wireless transmitter, the received data including the identifier for the wireless transmitter detected by the second user device;
   accessing, by the one or more computers, stored mapping data that indicates messages corresponding to wireless transmitters at different locations, wherein the stored mapping data associates individual posts in the social network with the respective wireless transmitters;
   determining, by the one or more computers, a message corresponding to the wireless transmitter based on the stored mapping data, wherein determining the message comprises:
      determining, based on the mapping data, that the identifier for the wireless transmitter is associated with the user-selected post in the social network that was selected from among the multiple posts shown on the user interface; and
      including the user-selected post in the social network in the message corresponding to the wireless transmitter; and
   in response to receiving the data sent by the second user device that includes the identifier for the wireless transmitter, providing, by the one or more computers, the determined message that includes the user-selected post in the social network to the second user device over the communication network, the determined message being provided for display at the second user device while the second user device is in sufficient proximity to the wireless transmitter to receive wireless messages from the wireless transmitter.

21. The one or more non-transitory computer-readable media of claim 20, wherein receiving the data sent by the second user device comprises receiving a user identifier for a second user of the second user device; and
   wherein determining the message comprises determining a portion of the message based on the user identifier for the second user of the second user device.

* * * * *